United States Patent
Ott

(10) Patent No.: US 9,575,272 B2
(45) Date of Patent: Feb. 21, 2017

(54) MANUFACTURING AND USING FERRULE-LESS MULTI-FIBER CONNECTORS

(71) Applicant: ADC Telecommunications, Inc., Berwyn, PA (US)

(72) Inventor: Michael James Ott, Chaska, MN (US)

(73) Assignee: CommScope Technologies LLC, Hickory, NC (US)

( * ) Notice: Subject to any disclaimer, the term of this patent is extended or adjusted under 35 U.S.C. 154(b) by 632 days.

(21) Appl. No.: 14/020,243

(22) Filed: Sep. 6, 2013

(65) Prior Publication Data

US 2014/0072265 A1   Mar. 13, 2014

Related U.S. Application Data

(60) Provisional application No. 61/698,147, filed on Sep. 7, 2012.

(51) Int. Cl.
  *G02B 6/36* (2006.01)
  *G02B 6/44* (2006.01)
  *B29D 11/00* (2006.01)
  *G02B 6/38* (2006.01)

(52) U.S. Cl.
  CPC ......... *G02B 6/4429* (2013.01); *B29D 11/0075* (2013.01); *G02B 6/3809* (2013.01); *G02B 6/3839* (2013.01); *G02B 6/4403* (2013.01); *G02B 6/4471* (2013.01); *G02B 6/3825* (2013.01); *G02B 6/3849* (2013.01);
  (Continued)

(58) Field of Classification Search
  CPC .................................................. G02B 6/3866
  See application file for complete search history.

(56) References Cited

U.S. PATENT DOCUMENTS

| 4,047,796 A | 9/1977 | Kao et al. |
| 4,102,561 A | 7/1978 | Hawk et al. |
| 4,824,197 A | 4/1989 | Patterson |

(Continued)

FOREIGN PATENT DOCUMENTS

| EP | 1 237 020 A2 | 9/2002 |
| EP | 2 549 313 A1 | 1/2013 |

(Continued)

OTHER PUBLICATIONS

PCT Application No. PCT/EP2014/051712, filed Jan. 29, 2014 entitled "Fiber Optic Connector With Fiber End Protection".

*Primary Examiner* — Sung Pak
*Assistant Examiner* — Hoang Tran
(74) *Attorney, Agent, or Firm* — Merchant & Gould P.C.

(57) ABSTRACT

A connection system includes an optical connector assembly; and an optical plug. The connector assembly includes a stack of gel-groove assemblies and a spring assembly mounted within a housing. Each of the gel-groove assemblies includes a first gel block at a first axial end, a second gel block at a second axial end, and a fiber mating region between the first and second gel blocks. The optical plug including sub-modules over-molded over arrays (e.g., ribbons) of the optical fibers. Each sub-module defines notches for receiving latches of the spring assembly when the optical plug is coupled to the first axial end of the optical adapter. Bare optical fibers extend from the plug, pass through the first axial gel block, and enter the fiber mating region when the plug is coupled to the adapter.

12 Claims, 21 Drawing Sheets

(52) U.S. Cl.
CPC .......... *G02B 6/3866* (2013.01); *G02B 6/3885* (2013.01); *G02B 6/3887* (2013.01); *G02B 6/3893* (2013.01)

(56) References Cited

U.S. PATENT DOCUMENTS

| | | | |
|---|---|---|---|
| 5,125,056 | A | 6/1992 | Hughes et al. |
| 6,678,442 | B2 | 1/2004 | Gall et al. |
| 6,779,931 | B2 | 8/2004 | Murata et al. |
| 7,077,577 | B2 | 7/2006 | Trezza et al. |
| 7,429,136 | B2 * | 9/2008 | Lewallen ............. G02B 6/3885 385/71 |
| 2005/0201697 | A1 | 9/2005 | Tanaka et al. |
| 2009/0269014 | A1 | 10/2009 | Winberg et al. |
| 2013/0156379 | A1 * | 6/2013 | Ott .......................... G02B 6/36 385/76 |
| 2013/0183001 | A1 | 7/2013 | Ott |
| 2015/0362681 | A1 | 12/2015 | Watte et al. |
| 2015/0378109 | A1 | 12/2015 | Samal et al. |

FOREIGN PATENT DOCUMENTS

| | | |
|---|---|---|
| EP | 2 549 314 A1 | 1/2013 |
| WO | WO 83/00935 | 3/1983 |
| WO | WO 2012/112343 | 8/2012 |
| WO | WO 2013/117598 A2 | 8/2013 |

* cited by examiner

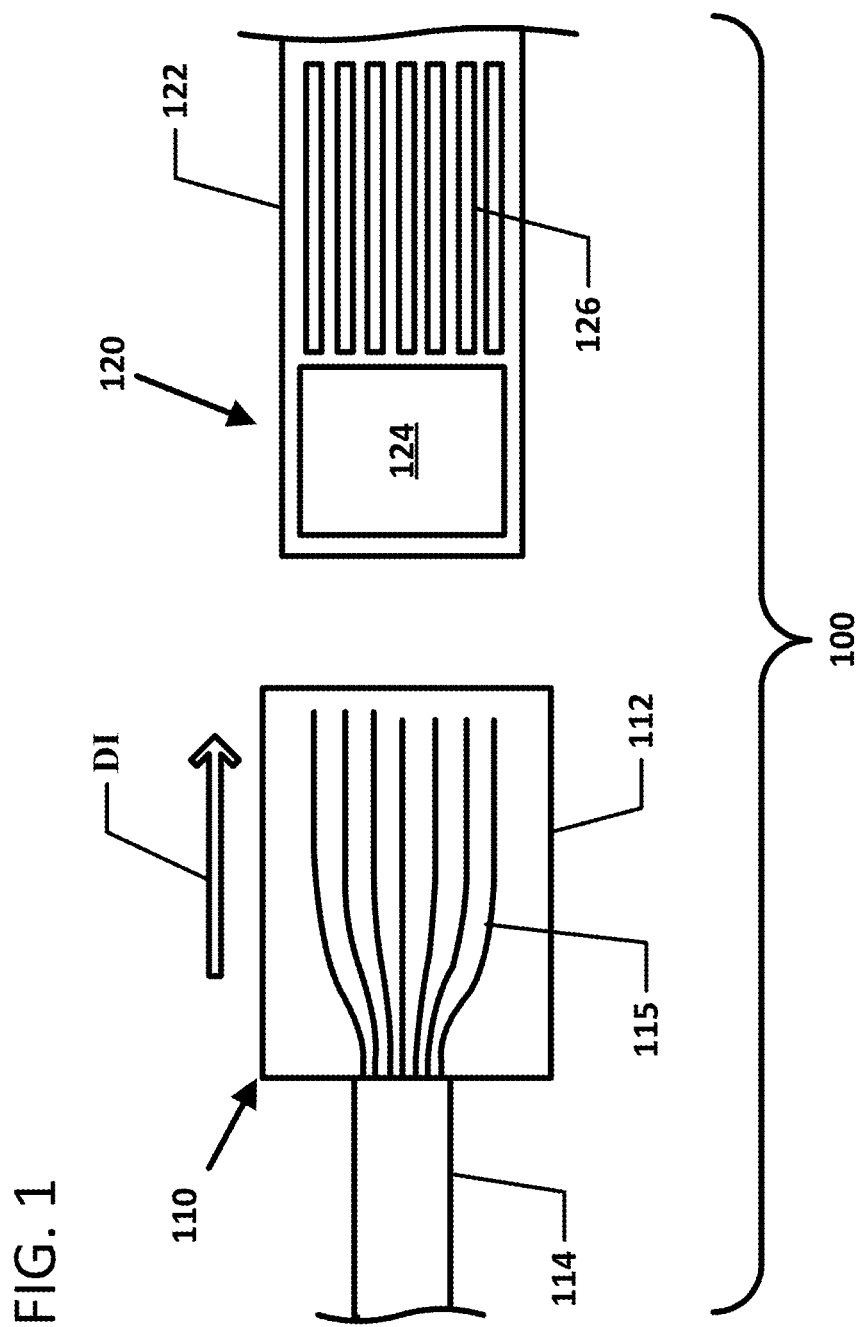

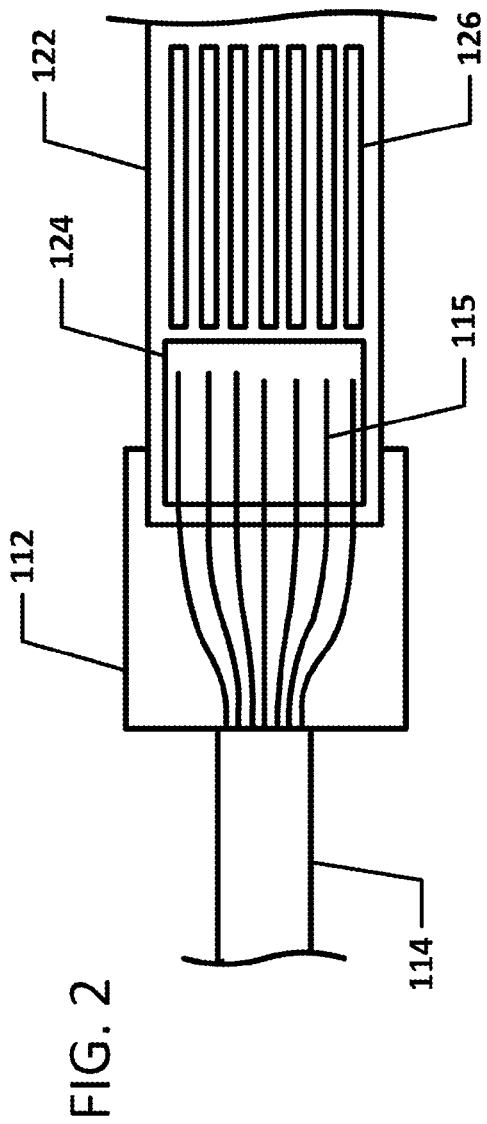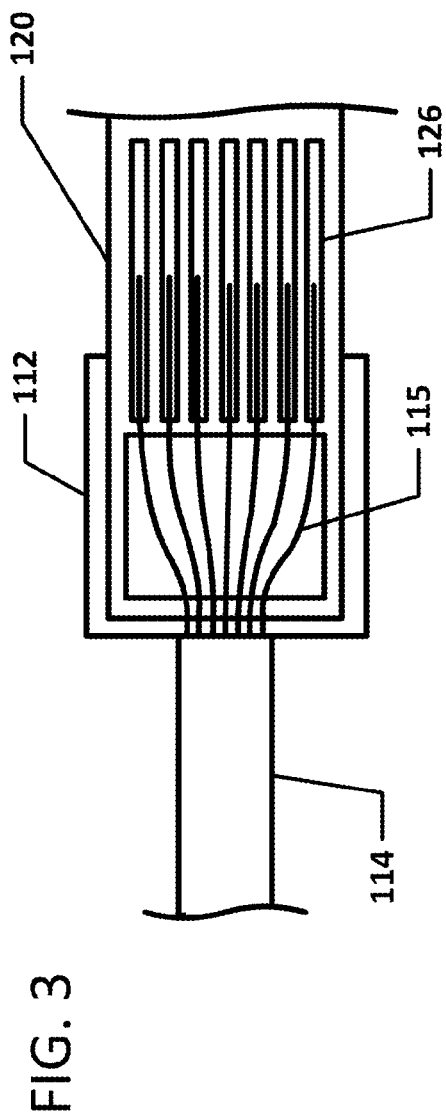

FIG. 6
FIG. 7
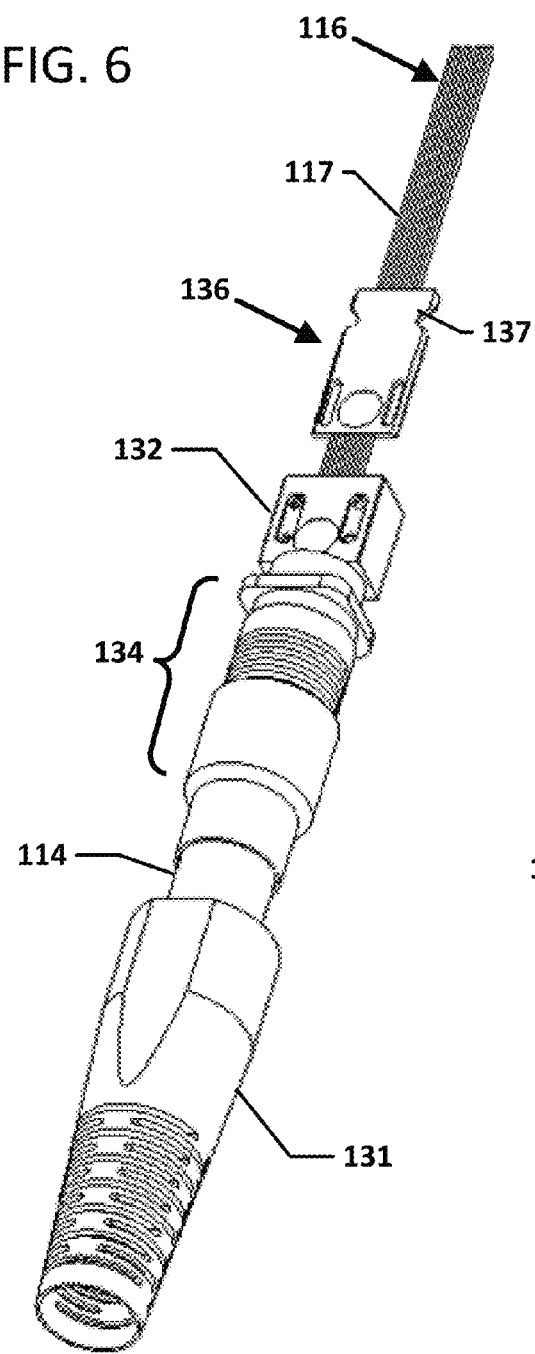
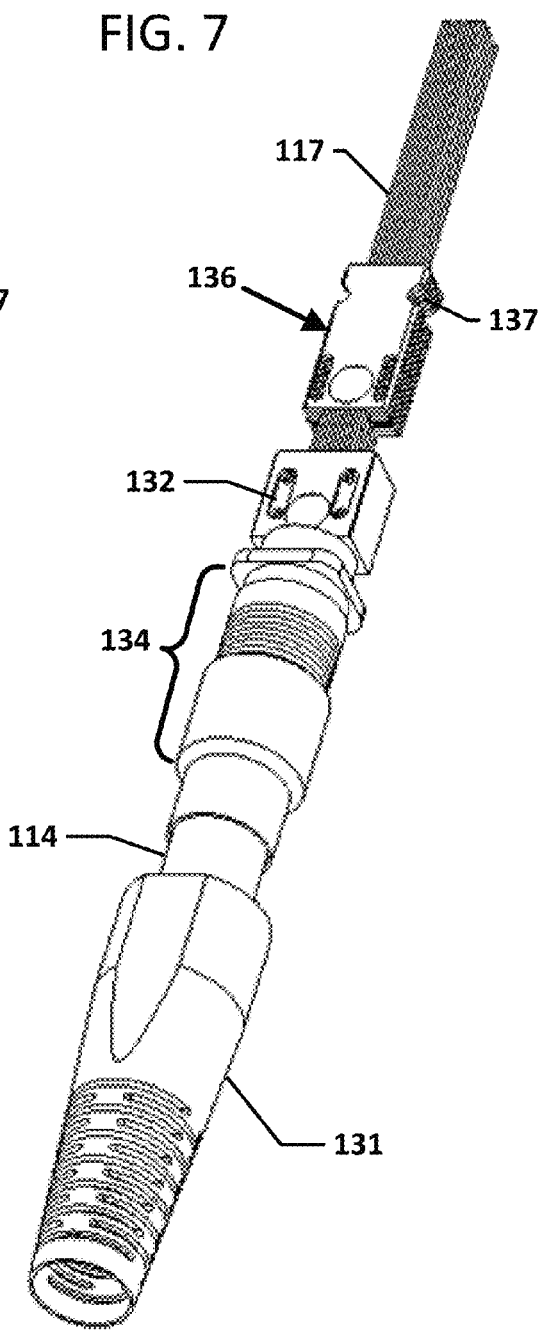

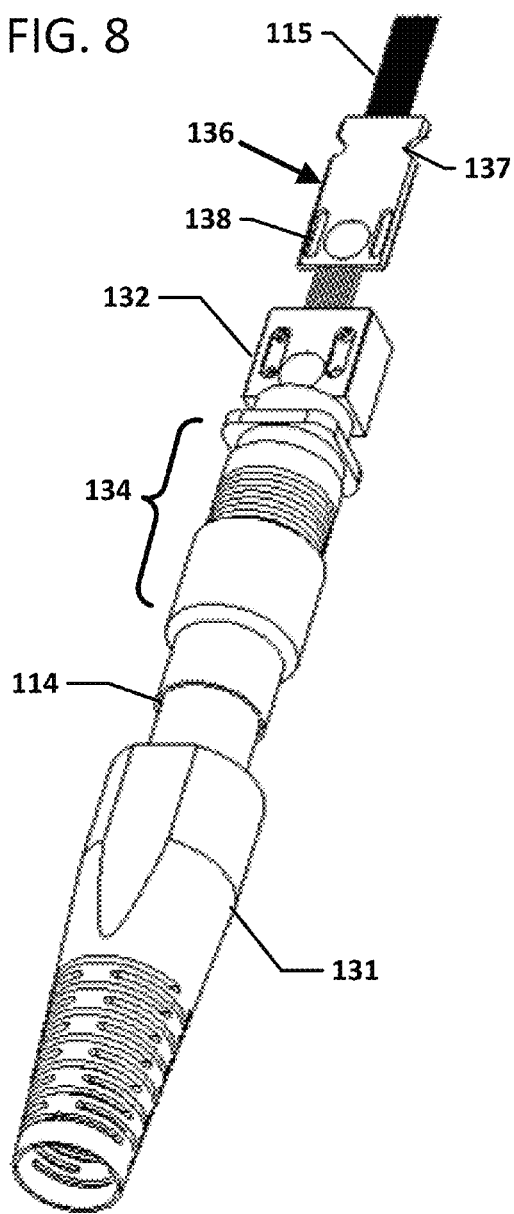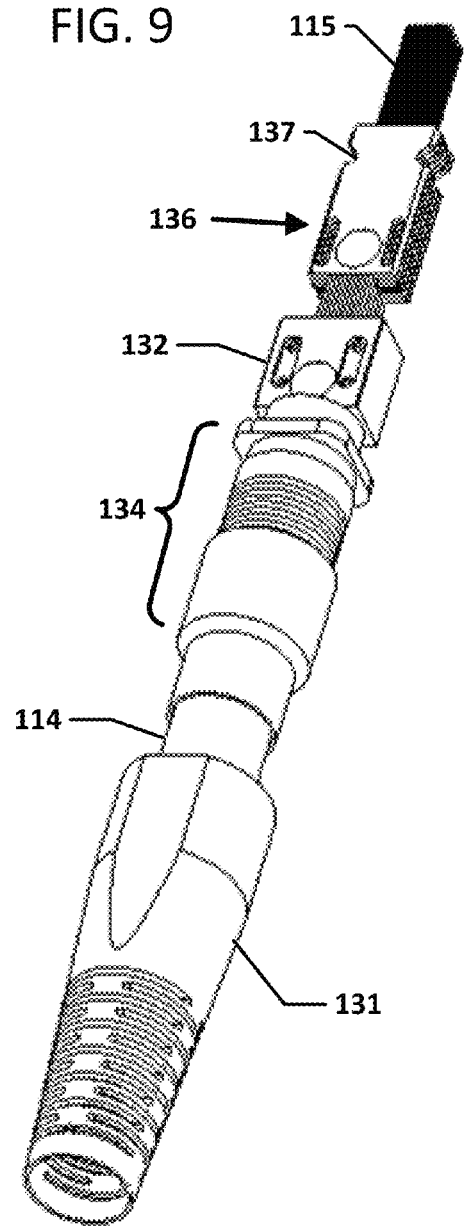

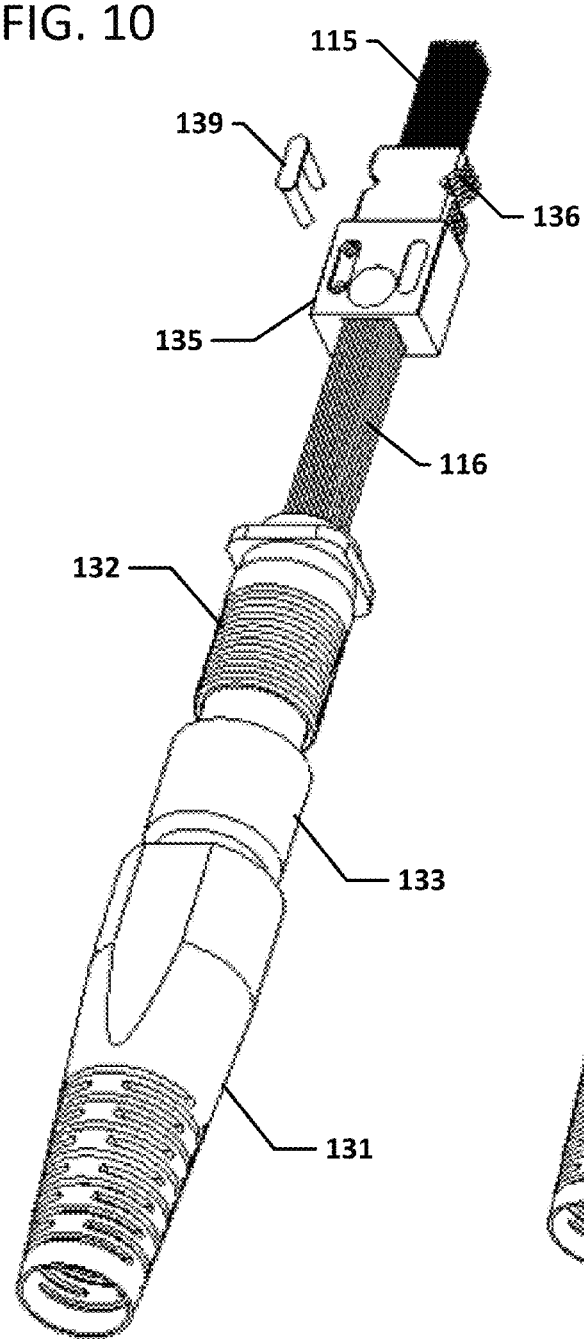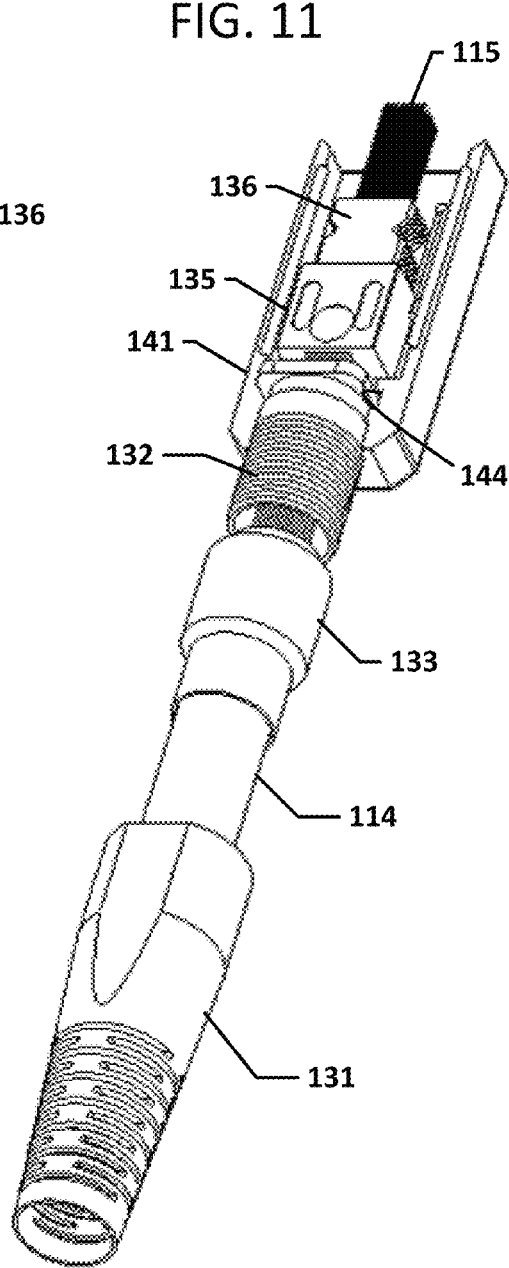

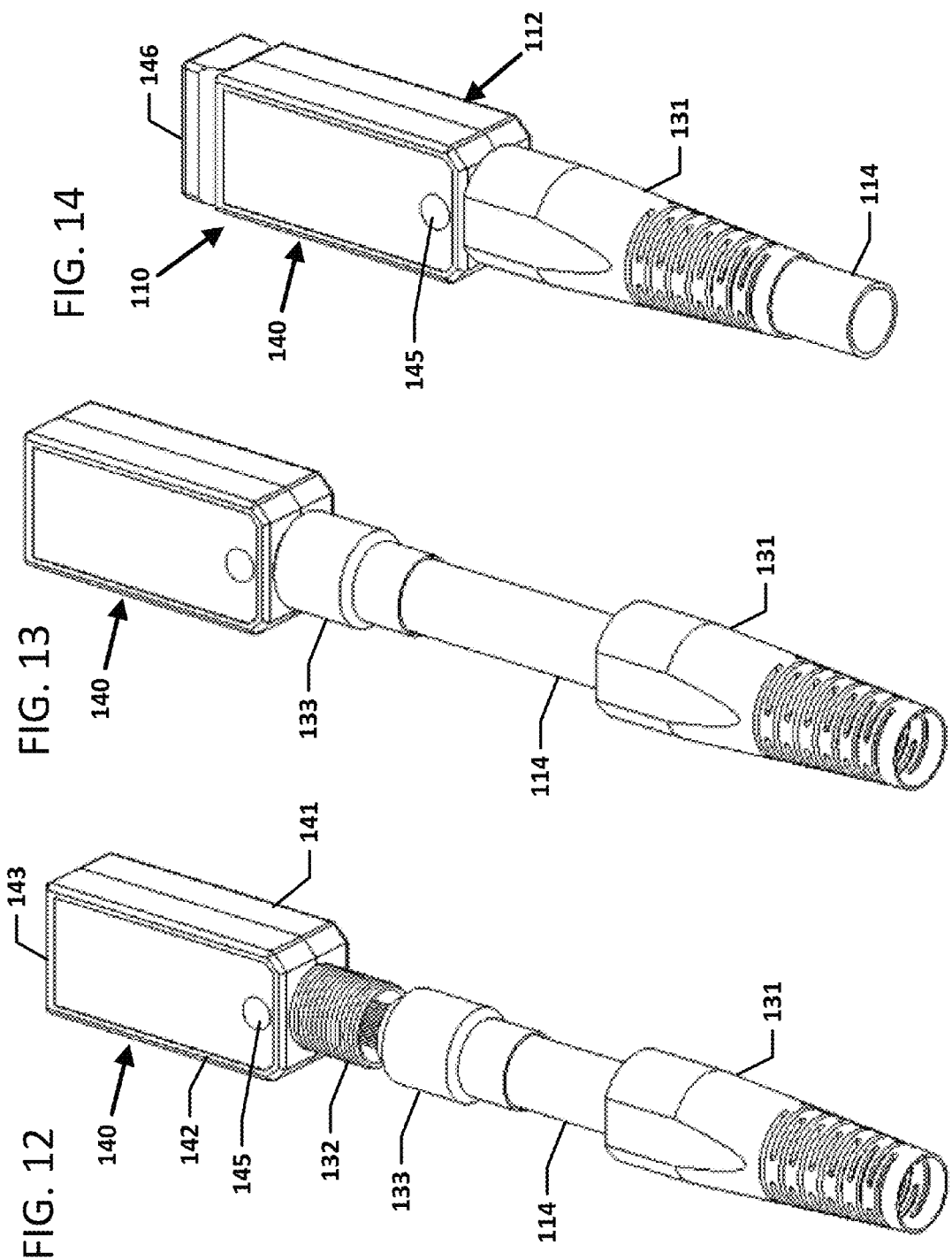

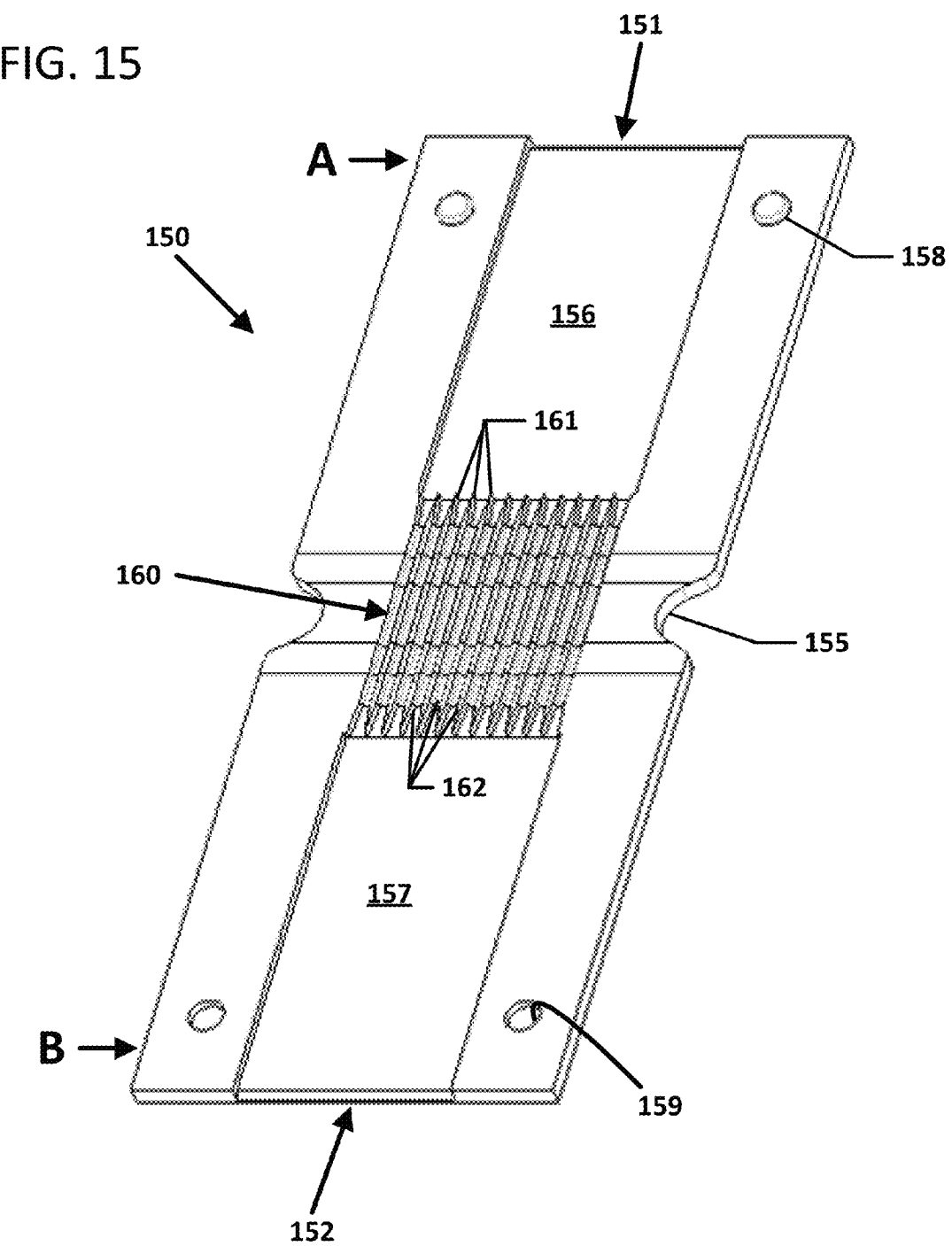

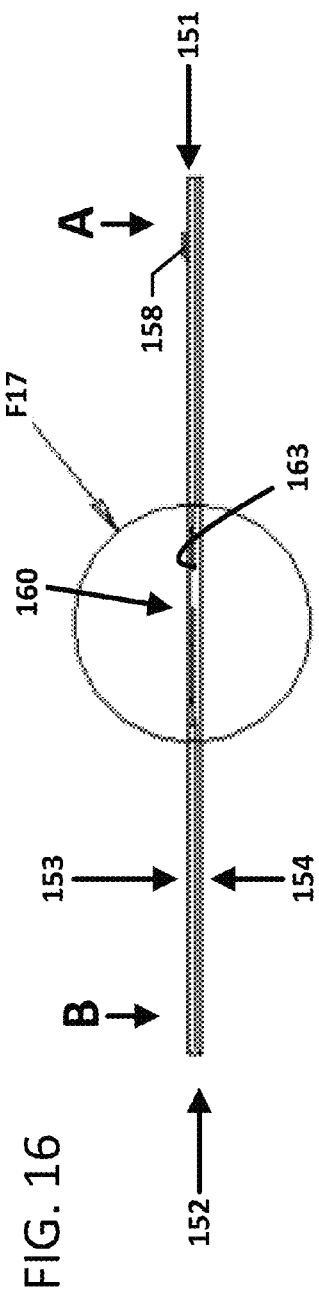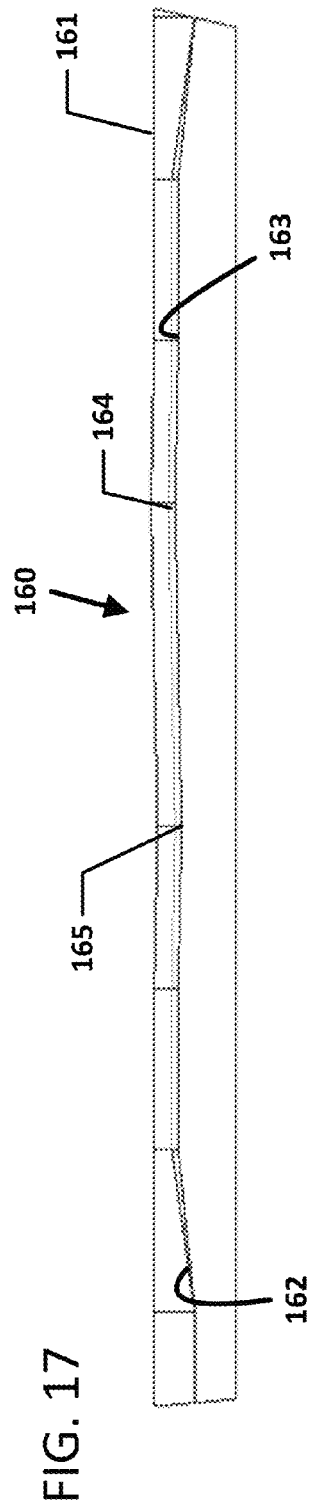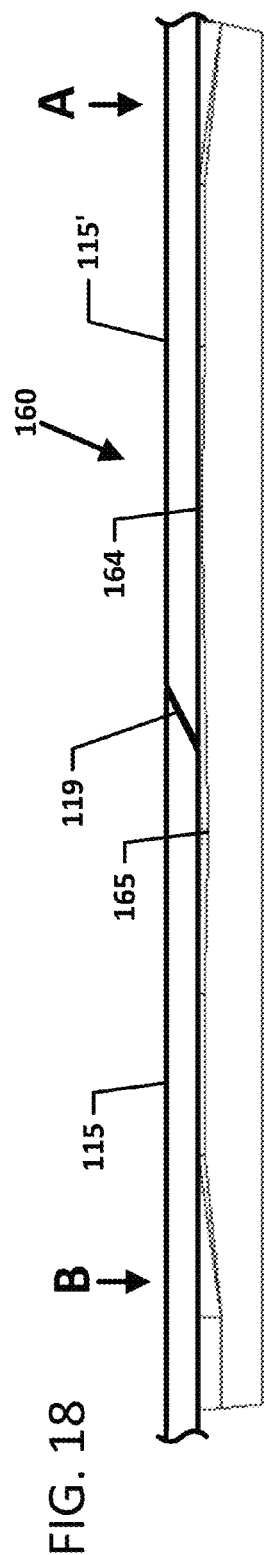

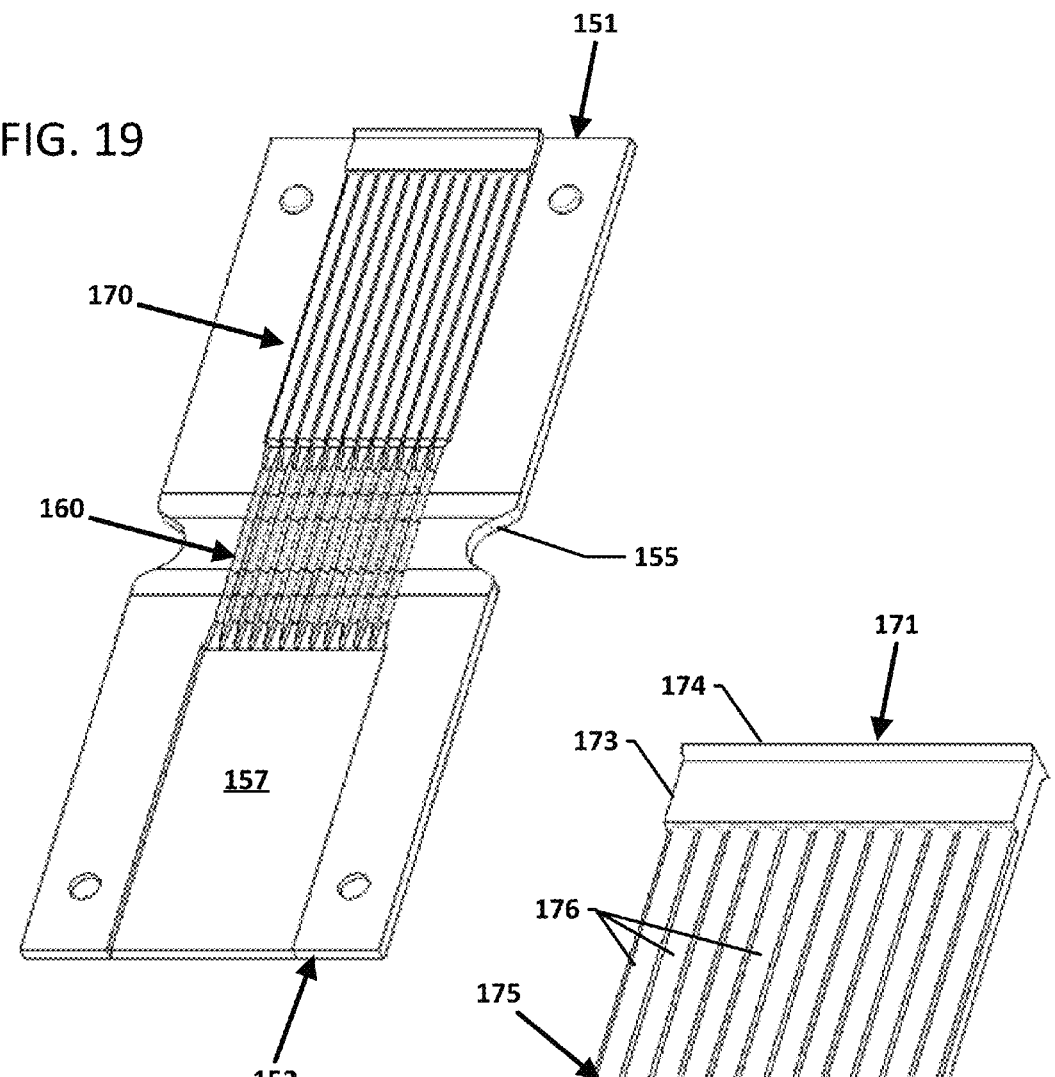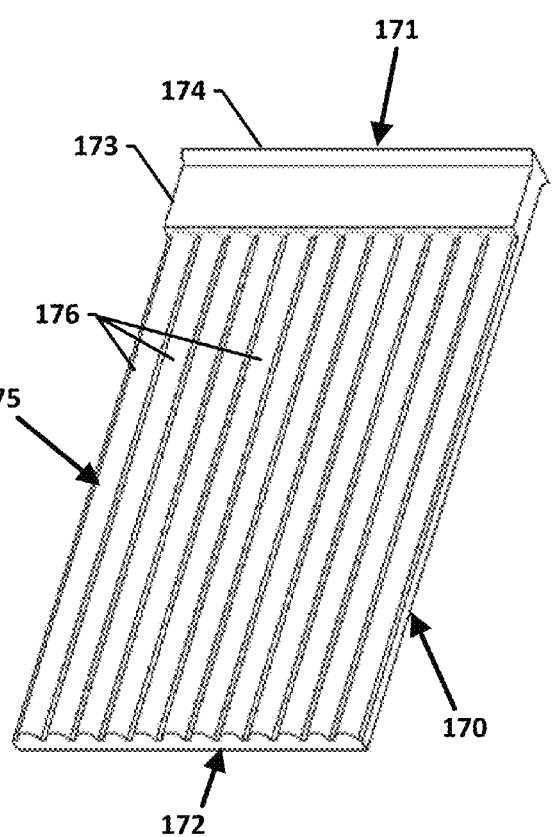

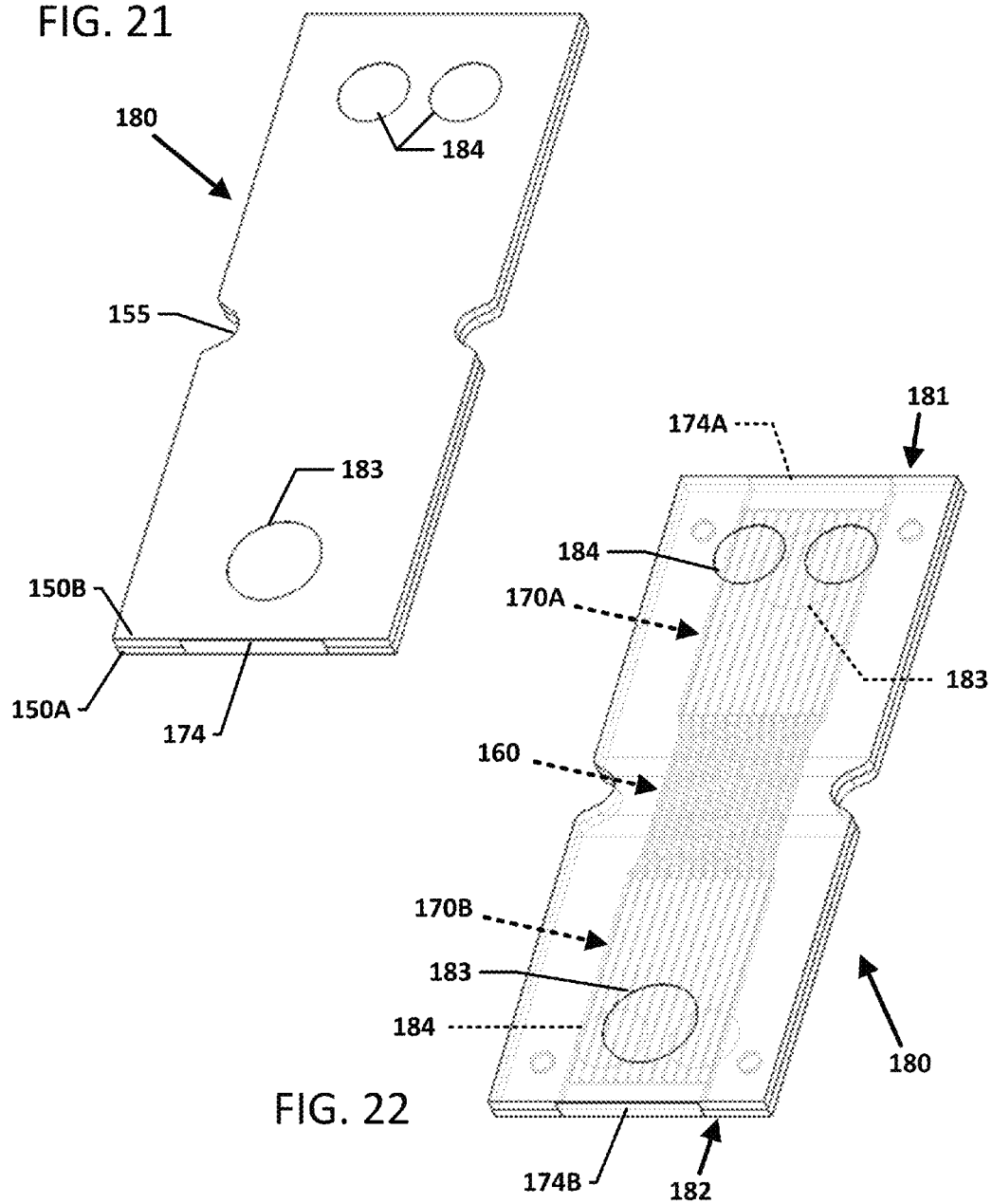

MANUFACTURING AND USING FERRULE-LESS MULTI-FIBER CONNECTORS

CROSS-REFERENCE TO RELATED APPLICATIONS

The present application claims the benefit of U.S. Provisional Patent Application No. 61/698,147, filed Sep. 7, 2012, and titled "Manufacturing and using Ferrule-less Multi-fiber Connectors," the disclosure of which is hereby incorporated herein by reference.

BACKGROUND

Conventional multi-fiber connectors (e.g., MPO connectors) have a tendency to collect dirt, dust, or other debris. For example, each of the optical fibers of such connectors tends to become contaminated with such debris. Further, debris can accumulate between the optical fibers. Moreover, such connectors can be difficult to clean because of the number and density of the optical fibers. Performance suffers when the optical fibers are not clear of debris.

In addition, manufacturing of multi-fiber connectors is expensive, time-consuming, and difficult. Ferrules to hold the fibers are expensive and difficult to manufacture. Insertion of the fibers into the ferrules also can be difficult. Each of the components is subject to collecting debris during manufacturing. Finally, each of the fibers must be polished after insertion into the ferrules. Polishing is difficult to accomplish with damaging the fibers because of the density of the optical fiber tips.

SUMMARY

Some aspects of the disclosure are directed to a connectorized optical cable including (a) a cable including optical fibers; (b) a sub-module formed around an array of at least some of the optical fibers; (c) an inner housing that receives and positions the sub-module; and (d) an outer housing that surrounds the inner housing and sub-module. The sub-module defines notches at longitudinal sides of the sub-module. Front sections of the optical fibers of the array extend forwardly of the sub-module. The front sections are not held by optical ferrules. The outer housing has a rear end that secures to the cable and an open front end through which tips of the optical fibers are accessible.

Other aspects of the disclosure are directed to an optical adapter including (a) at least one gel-groove assembly; (b) a spring assembly; and (c) an outer housing. The gel-groove assembly extends from a first axial end to a second axial end. The gel-groove assembly includes a fiber mating region disposed at an intermediate point between the first and second axial ends. The gel-groove assembly also includes a first gel block extending between the first axial end and the fiber mating region, and a second gel block extending between the second axial end and the fiber mating region. The spring assembly includes at least one spring element positioned at a longitudinal side of the gel-groove assembly. The spring element is axially fixed to the gel-groove assembly. The spring element is configured to laterally position the gel-groove assembly. The spring element includes latches. The outer housing defines a through-passage extending between first and second ends of the outer housing. The through-passage is sized to accommodate the gel-groove assembly and the spring assembly. The spring assembly is axially fixed relative to the outer housing. The first axial end of the gel-groove assembly is accessible through the first end of the outer housing and the second axial end of the gel-groove assembly is accessible through the second end of the outer housing.

Other aspects of the disclosure are directed to a method of connectorizing an optical cable including a jacket surrounding optical fibers. The method includes stripping a portion of the jacket to expose the optical fibers at a stripped region of the cable; sliding an inner housing over the stripped region of the cable; over-molding a sub-module around an array of the optical fibers so that front portions of the optical fibers extend forwardly of the sub-module; processing the front portions including stripping the front portions to produce sections of bare optical fibers and forming angled tips on the bare optical fiber sections; sliding the inner housing forwardly over the sub-module so that at least a portion of the sub-module is disposed within the inner housing and securing the inner housing at an axially fixed position relative to the sub-module; and mounting the inner housing within an outer housing.

Other aspects of the disclosure are directed to a connection system including (a) an optical connector assembly; and (b) an optical plug. The optical connector assembly includes a stack of gel-groove assemblies and a spring assembly mounted within a housing. Each of the gel-groove assemblies includes a first gel block at a first axial end, a second gel block at a second axial end, and a fiber mating region between the first and second gel blocks. The spring assembly includes spring elements that couple to the stack of gel-groove assemblies. Each of the spring elements includes first latches and second latches. The optical plug terminates a fiber optic cable. The optical plug includes sub-modules over-molded over arrays (e.g., ribbons) of the optical fibers. Each sub-module defines notches at longitudinal sides of the sub-modules. The notches are sized to receive the first latches of the spring elements when the optical plug is coupled to the first axial end of the optical adapter. The first latches hold the optical plug to the optical adapter. Bare optical fibers extend from the sub-modules, pass through the first axial gel block of the optical connector assembly, and enter the fiber mating region of the optical connector assembly when the optical plug is coupled to the first axial end of the optical adapter.

A variety of additional inventive aspects will be set forth in the description that follows. The inventive aspects can relate to individual features and to combinations of features. It is to be understood that both the forgoing general description and the following detailed description are exemplary and explanatory only and are not restrictive of the broad inventive concepts upon which the embodiments disclosed herein are based.

BRIEF DESCRIPTION OF THE DRAWINGS

The accompanying drawings, which are incorporated in and constitute a part of the description, illustrate several aspects of the present disclosure. A brief description of the drawings is as follows:

FIG. 1 is a schematic diagram of an example connection system including a plug and an adapter or female plug connector;

FIG. 2 is a schematic diagram showing the plug of FIG. 1 being inserted within the adapter or female plug connector including showing optical fibers of the plug passing through a cleaning region of the adapter of female plug connector;

FIG. 3 is a schematic diagram showing the plug of FIG. 1 fully inserted within the adapter or female plug of FIG. 1 so that the optical fibers extend along channels at a fiber mating region of the adapter or female plug connector;

Figure 4:
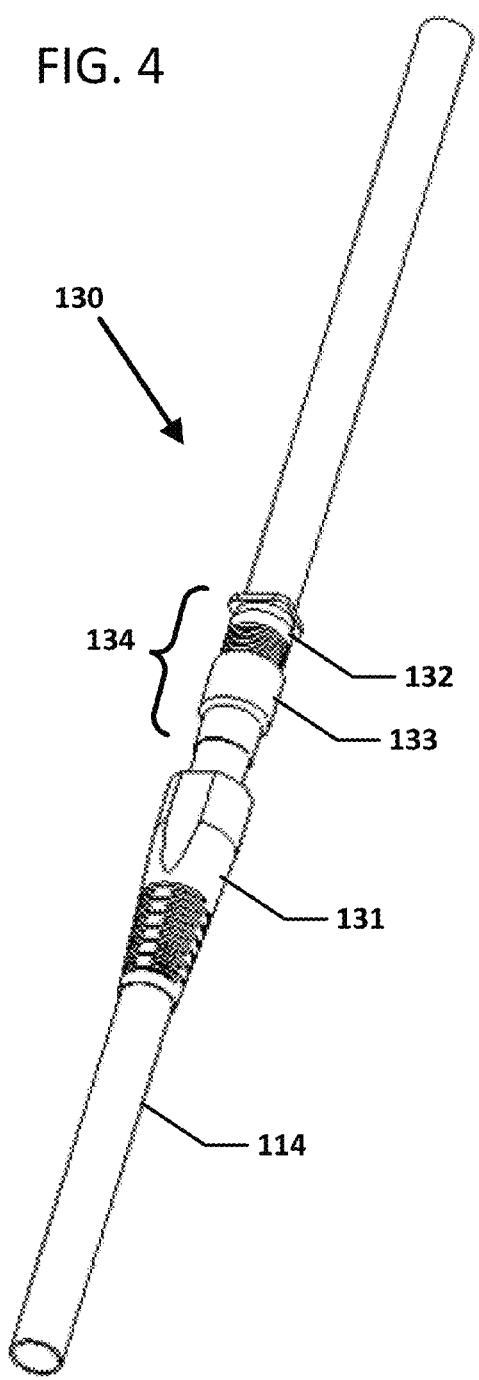
Figure 5:
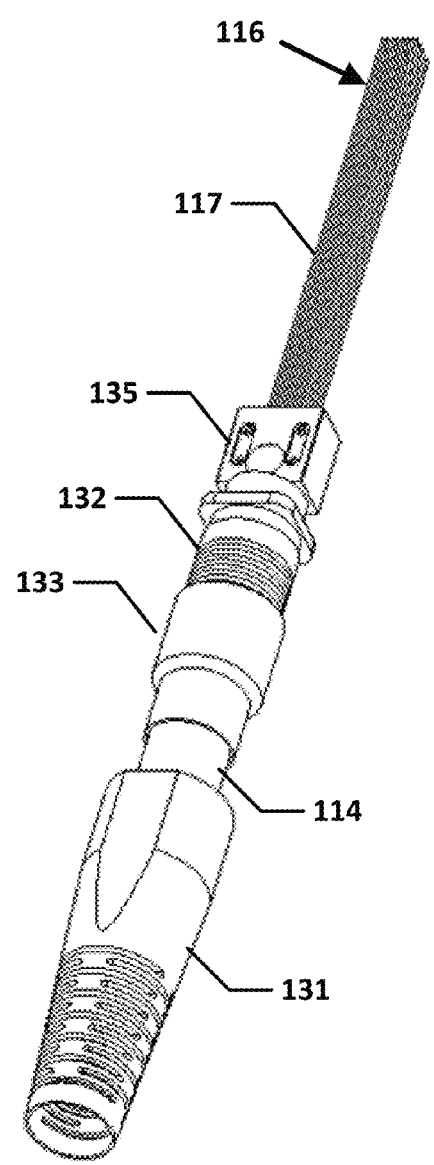
Figure 23:
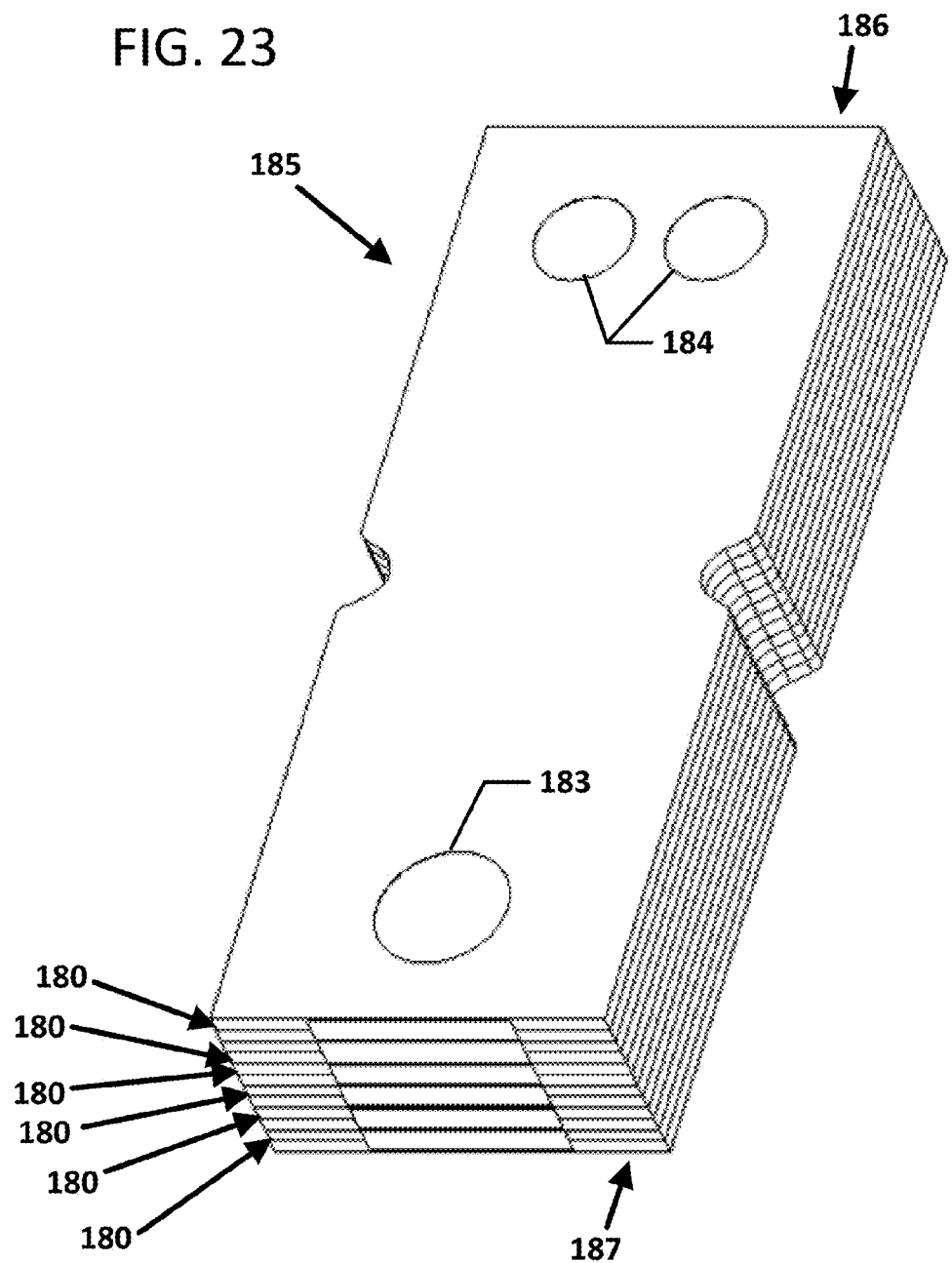
Figure 24:
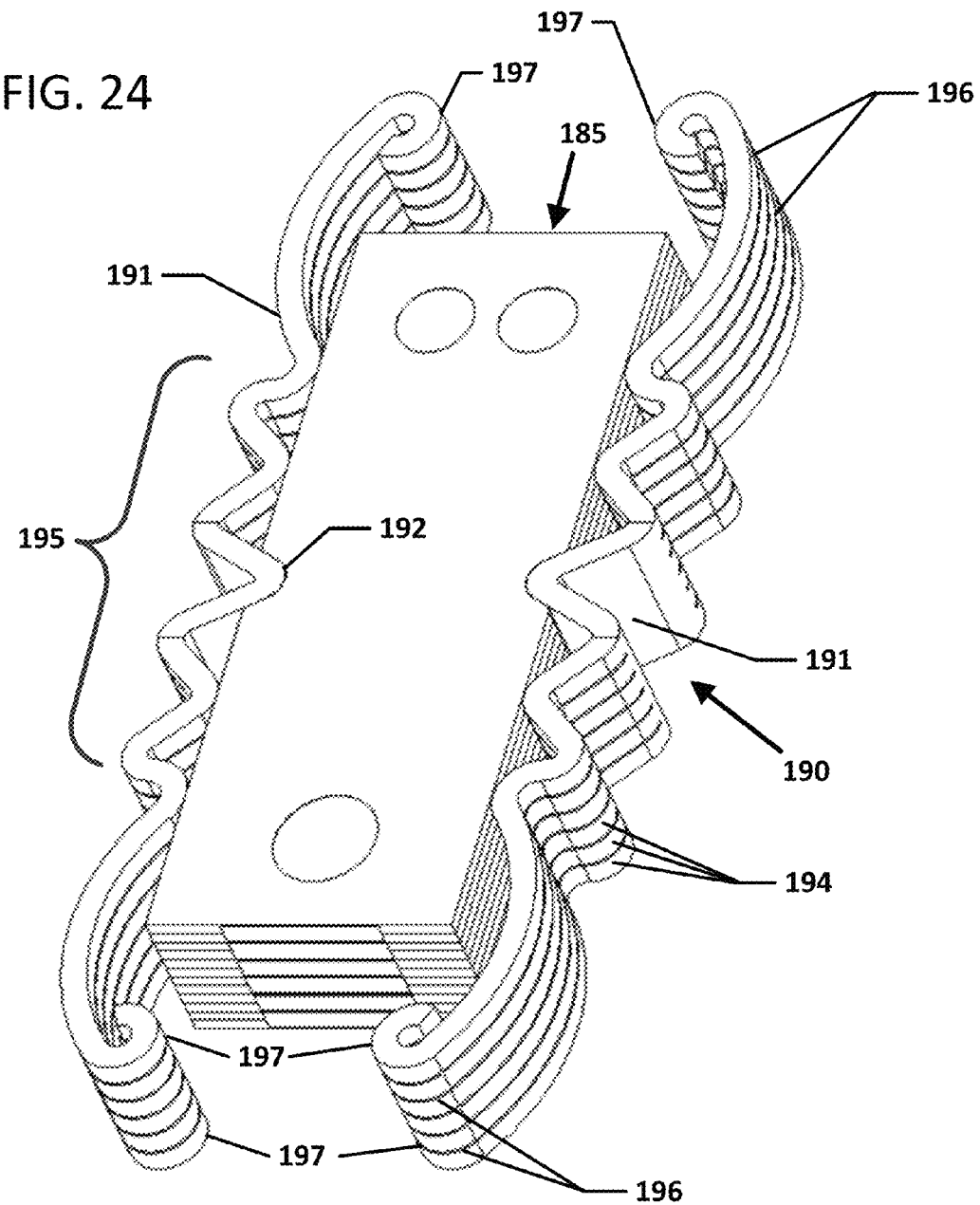
Figure 25:
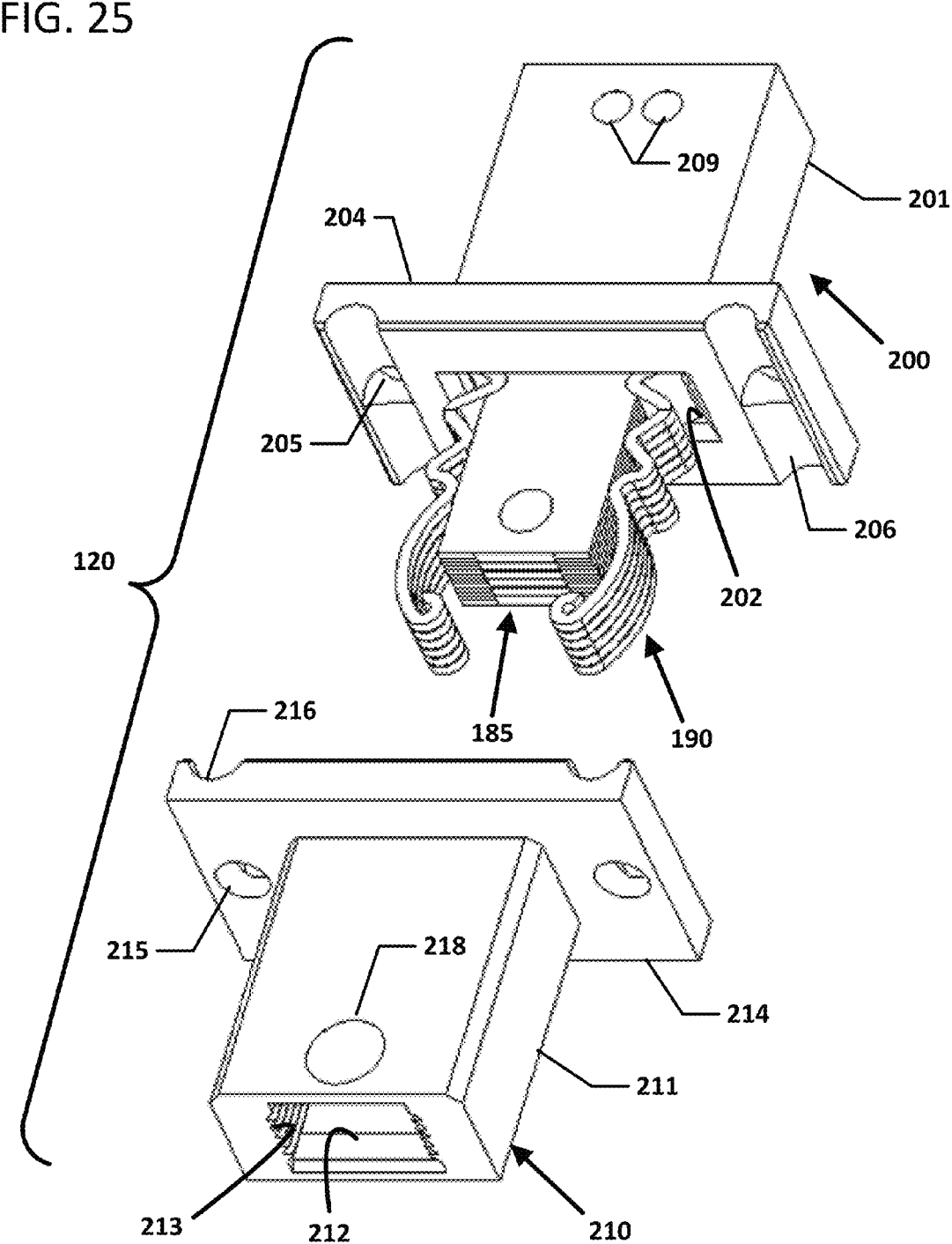
Figure 26:
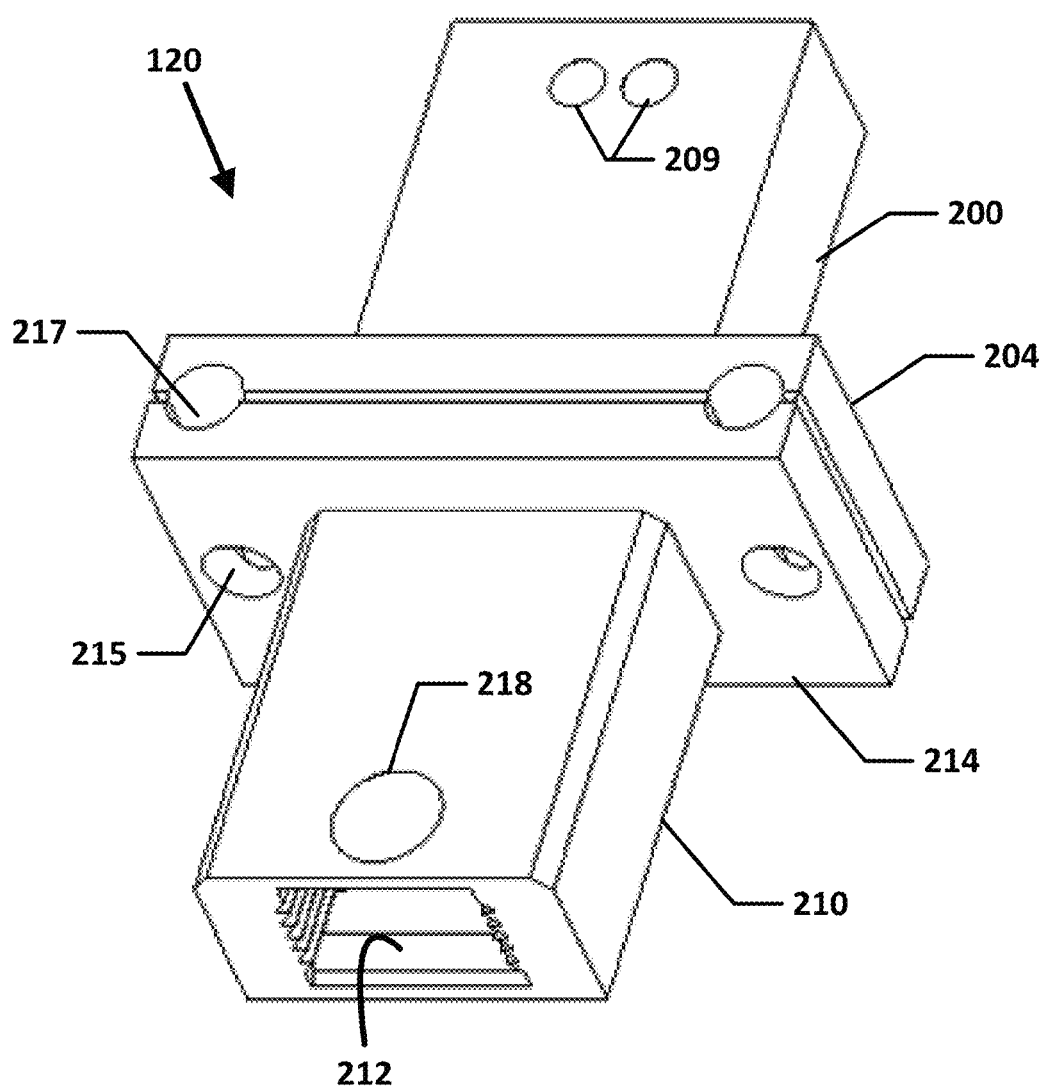
Figure 27:
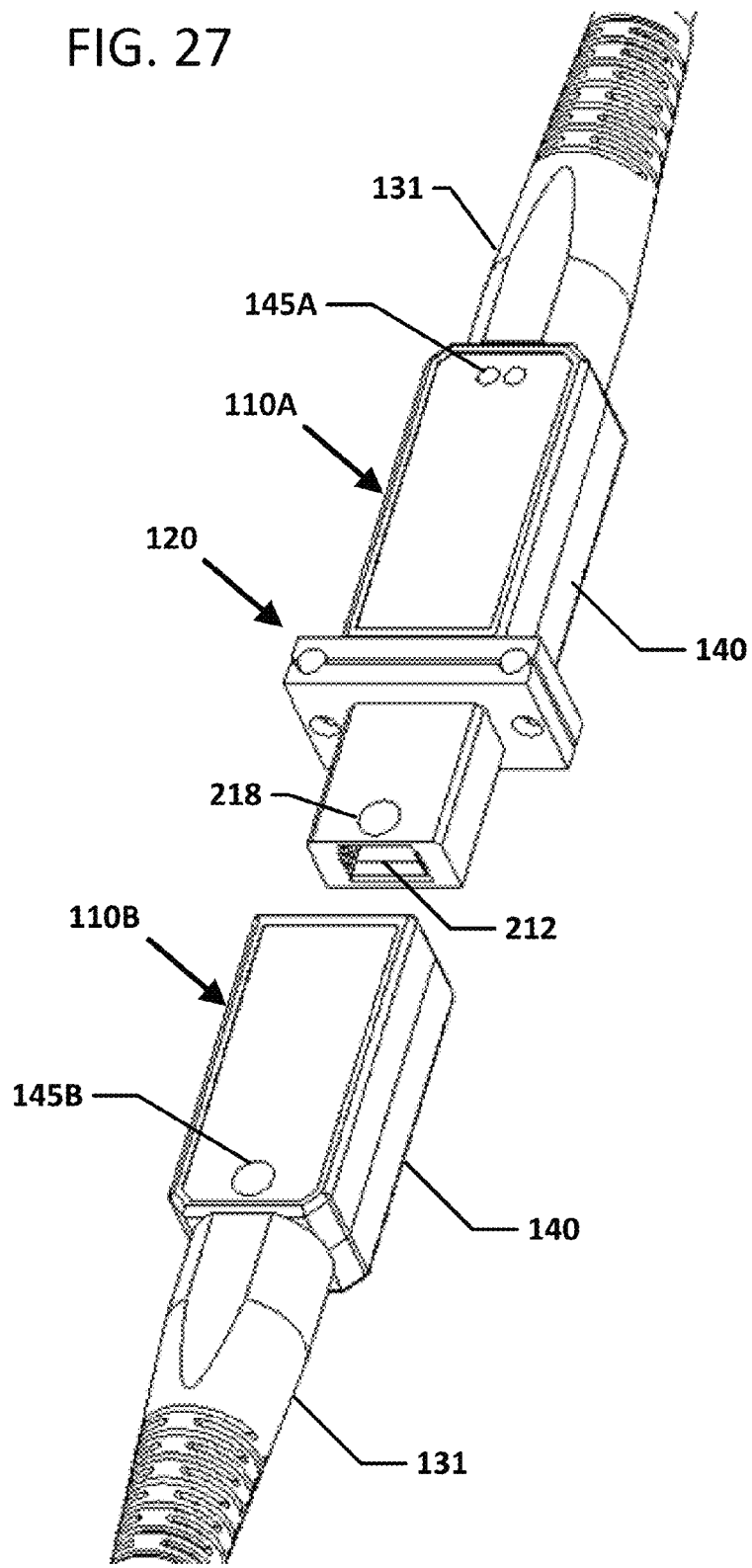
Figure 28:
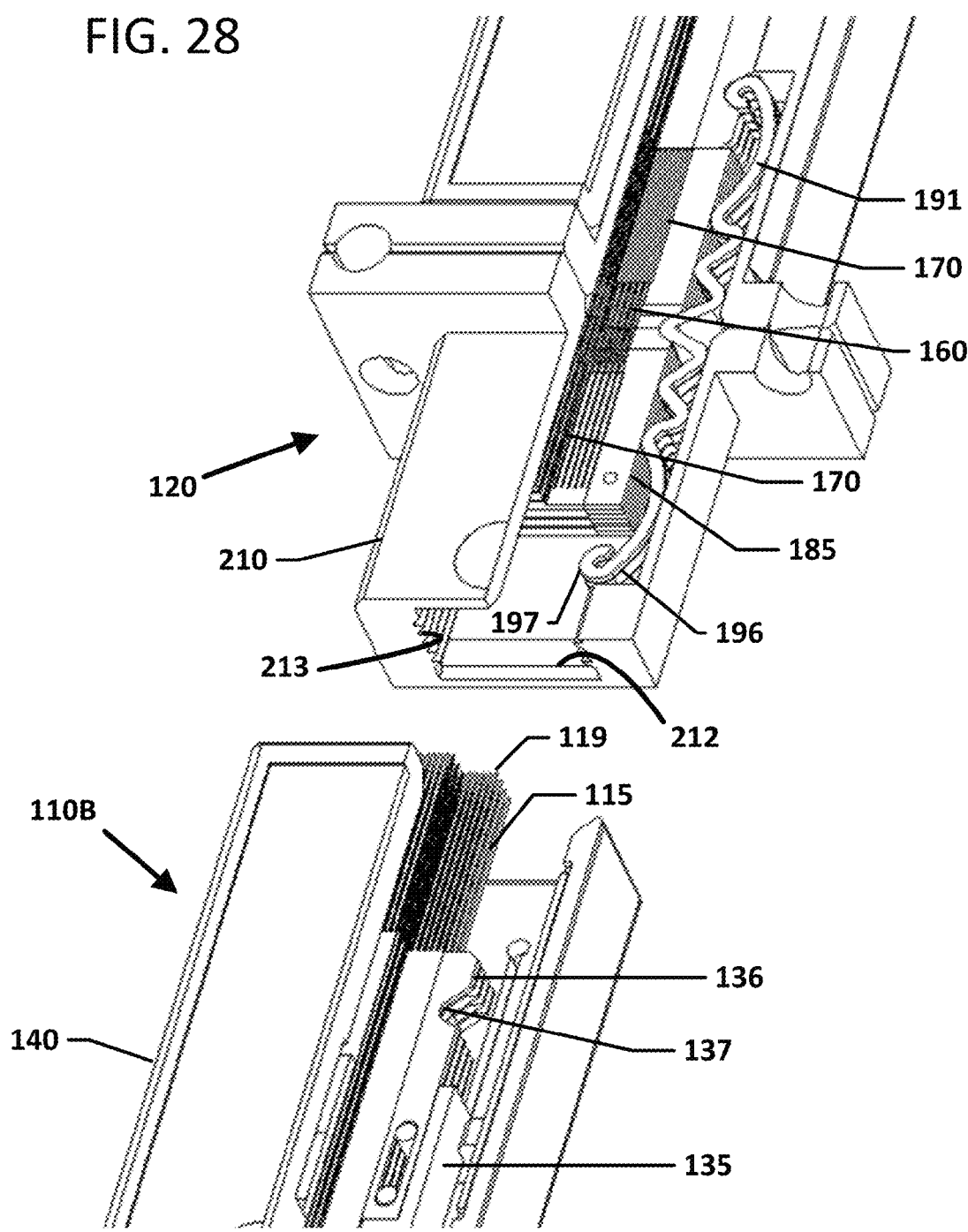
Figure 29:
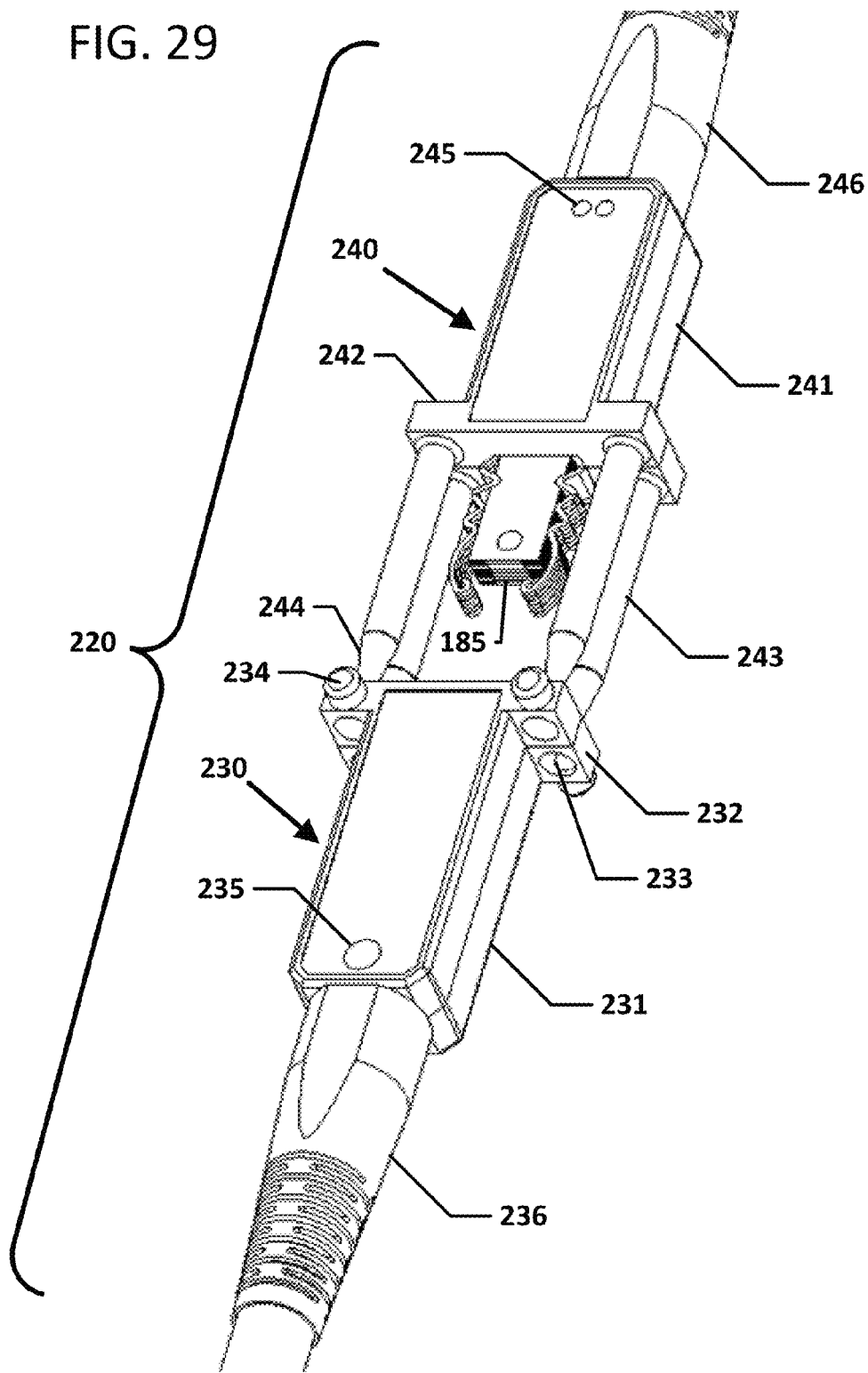
Figure 30:
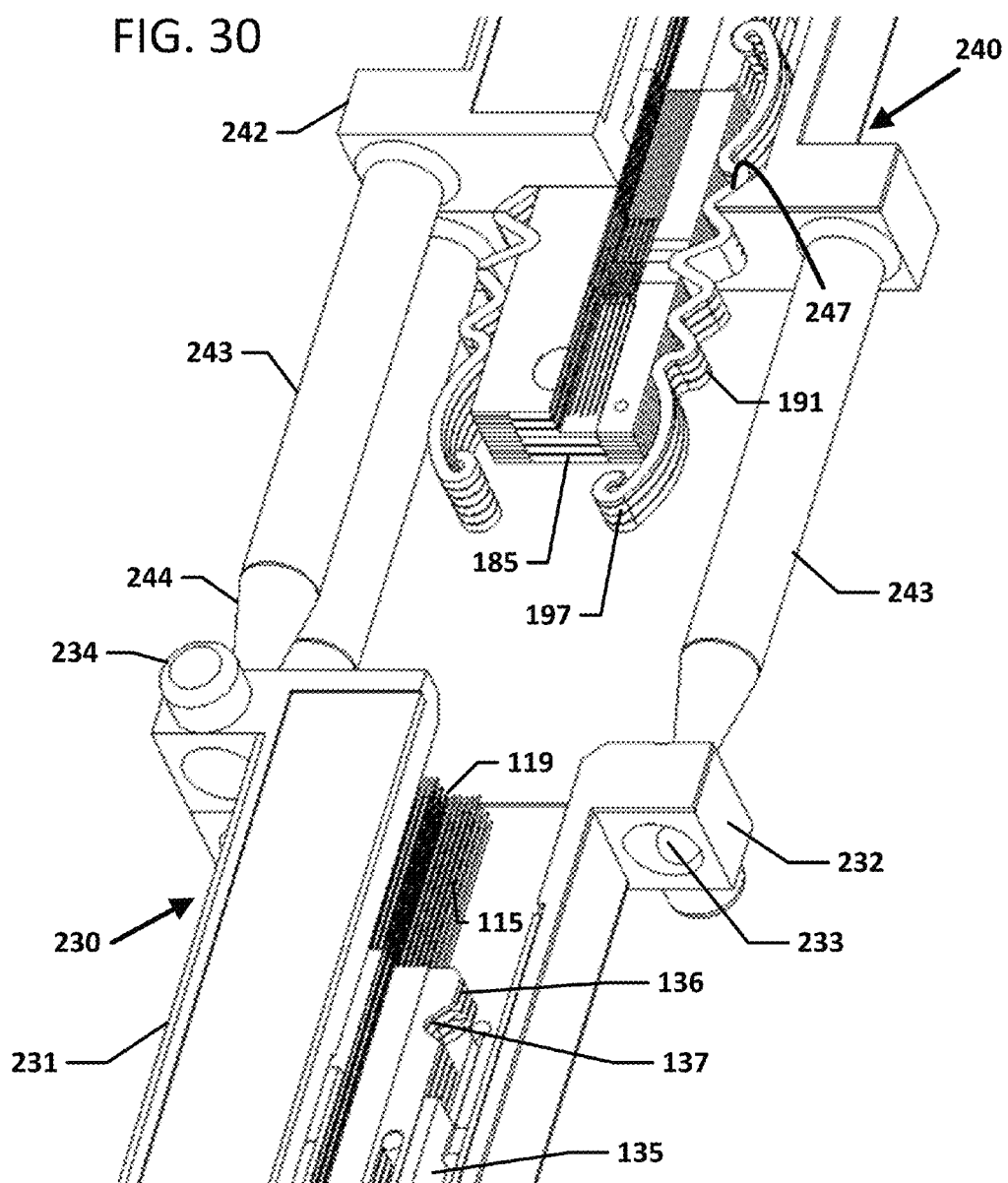
Figure 31:
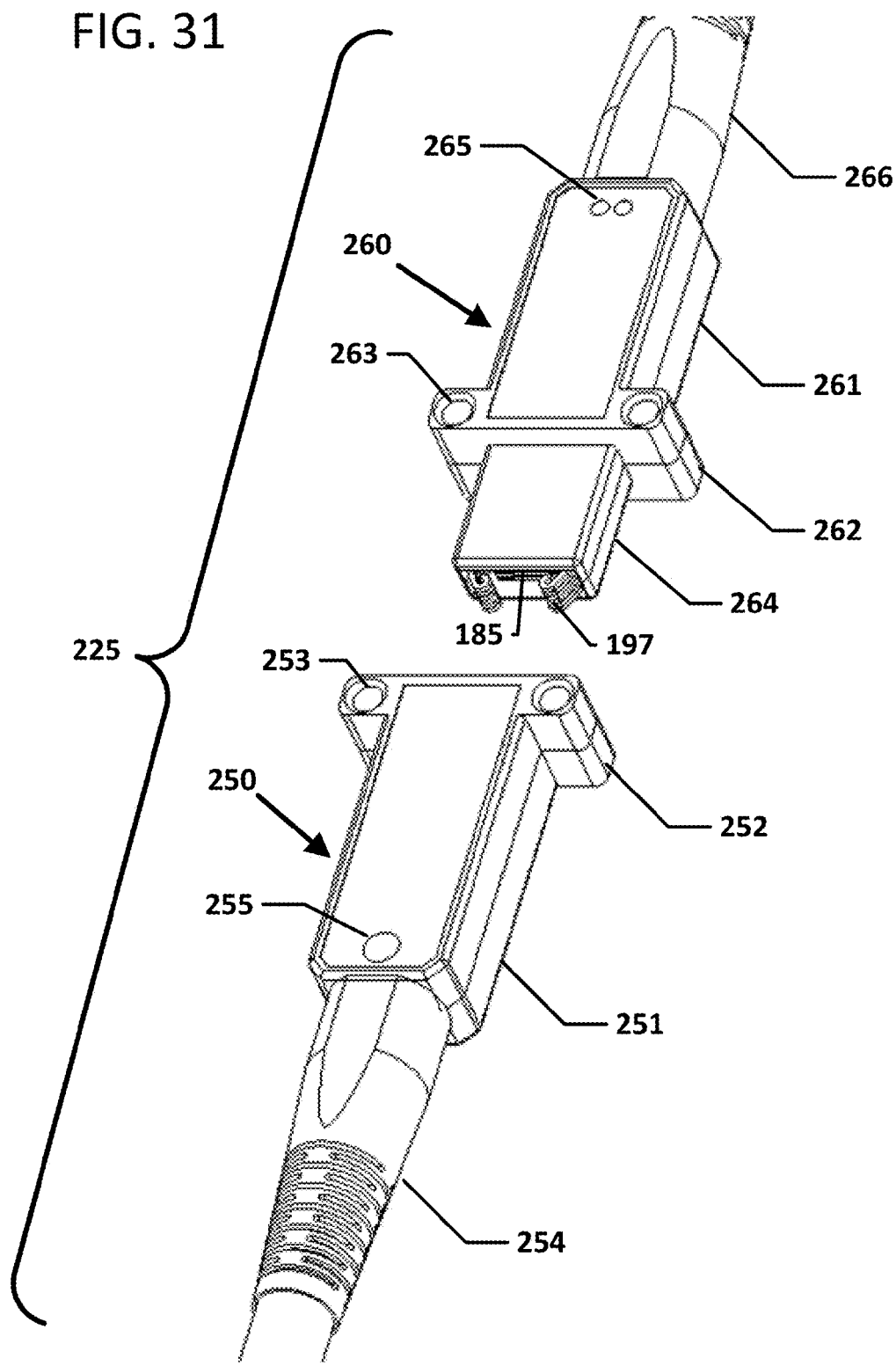
Figure 32:
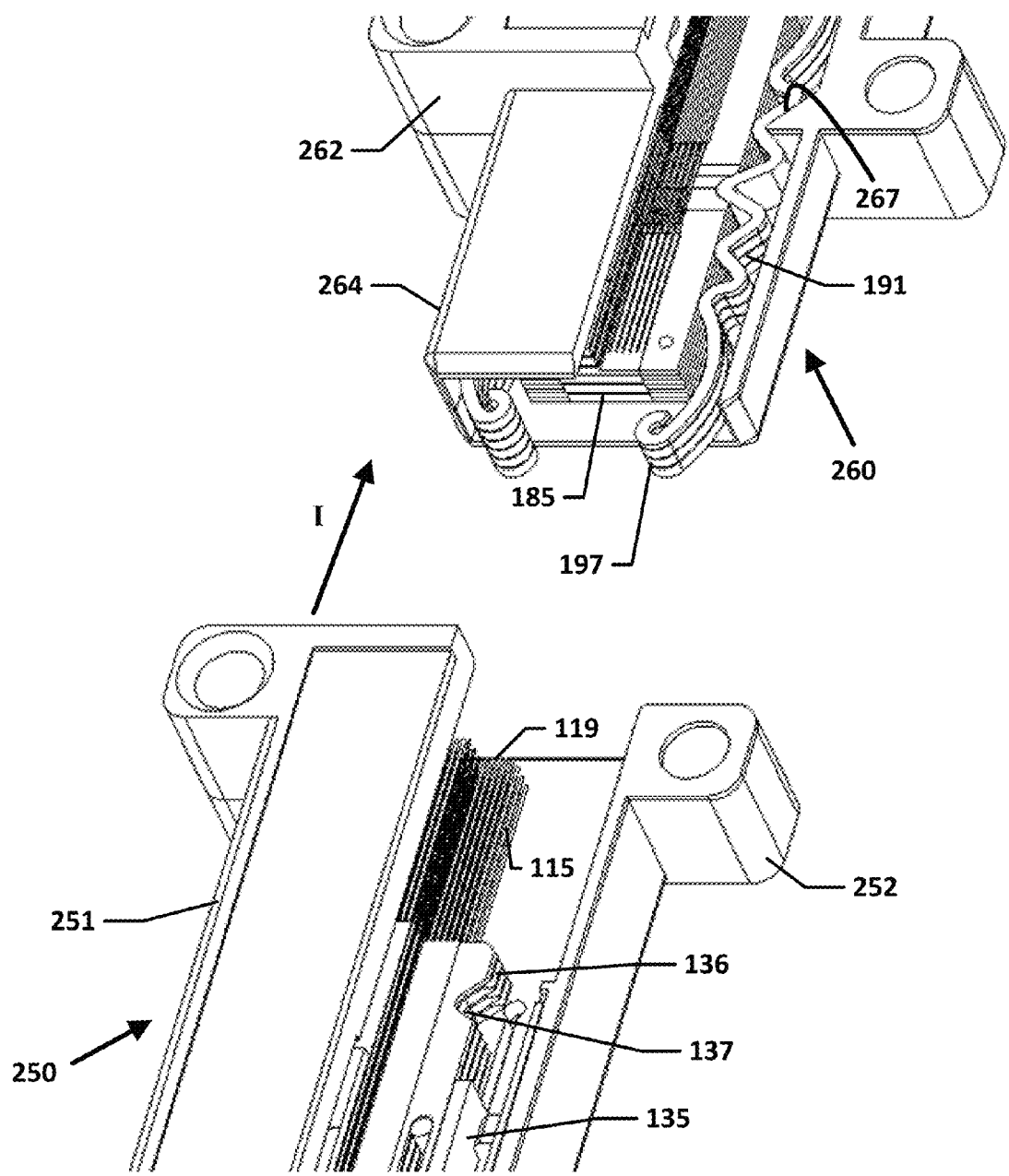

FIG. 4 is a perspective view of a cable with a boot and crimp assembly mounted thereon;

FIG. 5 is a perspective view of the cable of FIG. 4 with a portion of the cable shown stripped and inner housing mounted over the cable;

FIG. 6 is a perspective view of the cable of FIG. 5 with a sub-module formed over one ribbon of the cable;

FIG. 7 is a perspective view of the cable of FIG. 6 with multiple sub-modules formed over ribbons of the cable;

FIG. 8 is a perspective view of the cable of FIG. 7 with one of the ribbons processed to form bare optical fiber tips;

FIG. 9 is a perspective view of the cable of FIG. 8 with multiple ribbons processed to form bare optical fiber tips;

FIG. 10 is a perspective view of the cable of FIG. 9 with the inner housing slide over the sub-modules and partially pinned in place;

FIG. 11 is a perspective view of the cable of FIG. 10 with a first part of the outer housing coupled to the inner components of an example optical plug;

FIG. 12 is a perspective view of the cable of FIG. 11 with the outer housing surrounding the inner components of the plug;

FIG. 13 is a perspective view of the cable of FIG. 12 with the crimp assembly utilized to secure retention/strength yarns of the cable to inhibit cable pull-out;

FIG. 14 is a perspective view of the cable of FIG. 13 with a dust cap mounted to the example optical plug;

FIG. 15 is a perspective view of an example groove plate suitable for use in the adapter or female plug connector of FIG. 1;

FIG. 16 is a side elevational view of the groove plate of FIG. 15;

FIG. 17 is an enlarged view of a section of FIG. 16 labeled F17 that shows a fiber mating region of the groove plate of FIG. 15;

FIG. 18 shows angled tips of two optical fibers mated at the fiber mating region of FIG. 17;

FIG. 19 shows a gel block mounted to the groove plate of FIG. 15;

FIG. 20 is an enlarged view of the gel block of FIG. 19 shown in isolation;

FIG. 21 is a perspective view of a gel-block assembly formed form two opposing and axially flipped groove plates of FIG. 15;

FIG. 22 shows the gel-block assembly of FIG. 21 as partially opaque so that interior features of the gel-block assembly are visible;

FIG. 23 is a perspective view of a stack of gel-block assemblies;

FIG. 24 is a perspective view showing a spring assembly coupled to the stack of FIG. 23;

FIG. 25 is an exploded view of one example optical adapter including a first housing part, a second housing part, a stack of gel-block assemblies, and a spring assembly;

FIG. 26 is a perspective view of the example optical adapter of FIG. 25 assembled together;

FIG. 27 shows the example optical plug of FIG. 14 being coupled to one axial end of the optical adapter of FIG. 26;

FIG. 28 is an enlarged view of a section of FIG. 27 with a quadrant of the optical plug and optical adapter removed so that interior features are visible;

FIGS. 29 and 30 are exploded views of a first alternative connection system including a backplane connector and a card connector; and FIGS. 31 and 32 are exploded views of a second alternative connection system including a backplane connector and a card connector.

DETAILED DESCRIPTION

Reference will now be made in detail to exemplary aspects of the present disclosure that are illustrated in the accompanying drawings. Wherever possible, the same reference numbers will be used throughout the drawings to refer to the same or like parts.

As shown in FIG. 1, a connection system 100 includes an optical plug 110 terminating a multi-fiber cable 114 and an adapter or female connector 120 configured to receive the optical plug 110. The optical plug 110 includes a housing 112 that enclose the optical fibers 115 of the cable 114. The plug housing 112 organizes the fibers 115 into one or more rows. In some implementations, the plug housing 112 organizes the fibers 115 into a single row. In other implementations, the plug housing 112 organizes the fibers 115 into multiple rows (e.g., two rows, three rows, four rows, five rows, six rows, seven rows, eight rows, etc.). In some implementations, each row includes twelve optical fibers 115. In other implementations, each row can include a greater or lesser number of fibers 115 (e.g., two fibers, six fibers, eight fibers, ten fibers, sixteen fibers, etc.).

The adapter or female connector 120 includes a housing 122 that extends from a first end to a second end. A cleaning region 124 is disposed at the first end of the housing 122. In some implementations, the second end of the housing 122 includes another cleaning region as will be discussed herein. In other implementations, the second end of the housing 122 terminates another multi-fiber cable as will be discussed herein. Channels 126 extend between the cleaning region 124 and the second end of the housing 122. The number of channels 126 generally corresponds with the number of fibers 115 in each row of the optical plug 110.

The cleaning region 124 contains a gel-based compound that cleans optical fibers 115 slid through the compound. The gel-based compound may be made of a thixotropic material. Example materials included in the gel-based compound may be silicones, urethanes, and/or Kratons (e.g., Krayton® D, Kraton® D (SBS) with styrene and butadiene, Kraton® D (SIS) with styrene and isoprene, Kraton® FG, Kraton® FG with maleic anhydride grafted onto the rubber midblock, Krayton® G, Kraton® G (SEBS, SEPS) with styrene-ethylene/butylene-styrene and/or styrene-ethylene/propylene-styrene, Kraton® IR isoprene rubbers, Kraton® IR Latex polyisoprene latex, Kraton® styrenic block copolymers (SBC), Kraton® triblock polymer, and/or oil gels based on Kraton® polymers). Kratons are marketed by Kraton Polymers U.S. LLC of Houston, Tex. USA. Other example materials included in the gel-based compound may be diblock polymer, polyisoprene, rubbery gels, thermoplastic gels, thermoset gels, thixotropic gels, and/or thixotropic grease. The gel-based compound may be formulated to be tacky, semi-tacky, or non-tacky. The gel-based compound is made of easily deformable material.

Further details regarding cleaning optical fibers using a gel material can be found in U.S. Application No. 61/531,855, filed Sep. 7, 2011, and titled "Optical Fiber Connection System;" U.S. Application No. 61/531,836, filed Sep. 7, 2011, and titled "Optical Fiber Alignment Device and Method;" and U.S. Application No. 61/531,830, filed Sep. 7, 2011, and titled "Tools and Methods for Preparing a Ferruleless Optical Fiber Connector," the disclosures of which are hereby incorporated herein by reference. Additional details can be found in U.S. Publication No. 2013/0216186; U.S. Publication No. 2013/0183001; and U.S. Publication No. 2013/0156379, the disclosures of which are hereby incorporated herein by reference.

As shown in FIGS. 2 and 3, moving the optical plug 110 in an insertion direction $D_I$ causes the tips 119 (e.g., see FIG. 18) of the optical fibers 115 of the plug 110 to enter the cleaning region 124 of the housing 122 (see FIG. 2). As the fibers 115 slide through the cleaning region 124, the gel removes dirt, dust, oil, and other contaminants from the tips 119 and sides of the optical fibers 115. Accordingly, the tips 119 of the optical fibers 115 are clean when the tips 119 emerge from the cleaning region 124 and enter the channels 126 (see FIG. 3). The channels 126 align the fibers 115 to mate/interface with optical fibers of a second multi-fiber cable as will be disclosed herein. Because the gel compound cleans the optical fibers 115 during insertion, no separate cleaning of the optical fibers 115 by a technician is required.

FIGS. 4-14 illustrate how an example optical plug 110 may be formed. First, as shown in FIG. 4, a strain-relief member (e.g., a boot) 131 and a crimp assembly 134 are slid over a jacketed portion of the multi-fiber cable 114. As shown in FIG. 5, the jacket is stripped from a portion of the cable 114 to expose buffered optical fibers 116. In some implementations, the buffered fibers 116 are arranged in a matrix of one or more fiber ribbons 117. In certain implementations, each ribbon 117 includes about twelve buffered fibers 116. In other implementation, each ribbon 117 has a greater or lesser number of fibers 116 (e.g., six fibers, eight fibers, ten fibers, sixteen fibers, etc.). In still other implementations, the buffered optical fibers 116 may be loose. An inner housing part 135 also is threaded over the buffered optical fibers 116 (see FIG. 5). In certain implementations, the inner housing part 135 is abutted against the terminated end of the jacket.

As shown in FIGS. 6 and 7, sub-modules 136 are formed so as to surround the buffered optical fibers 116. Each sub-module 136 is formed around an array of one or more optical fibers 116. In some implementations, the sub-modules are overmolded around the fiber arrays. In certain implementations, each sub-module 136 holds all of the buffered fibers 116 of an optical fiber ribbon 117. In other implementations, loose fibers 116 are ribbonized before the sub-modules 136 are formed. In still other implementations, loose fibers 116 are grouped in rows and the sub-modules 136 are formed around each row.

In certain implementations, the sub-modules 136 are formed one at a time. For example, all but one fiber array or ribbon 117 may be peeled back from a matrix of ribbon fibers and a sub-module may be formed around the remaining fiber ribbon 117 (see FIG. 6). Sub-modules are subsequently formed around adjacent arrays or ribbons one at a time. The sub-modules 136 are formed at about the same axial location on the array or ribbon 117 so that the sub-modules 136 form a stack. Each sub-module 136 defines notches 137 at opposite sides that we be discussed in more detail herein. Each sub-module 136 also defines apertures 138 extending therethrough on opposite sides of the ribbon 117.

The sub-modules 136 facilitate handling of each ribbon 117 by providing organization and stability to the buffered fibers 116. Accordingly, as shown in FIGS. 8 and 9, the buffered optical fibers 116 extending from the sub-modules 136 are processed ribbon-by-ribbon. The buffer tubes are stripped to provide bare optical fibers 115. Lubrication is added to the bare optical fibers 115 to inhibit abrasion of the fibers 115 and/or to inhibit dirt, dust, and other debris from clinging to the fibers 115. For example, a coating including hydrophilic polymers can be applied to the fibers. In some implementations, the coating includes a self-assembled monolayer (SAM). In certain implementations, the bare fibers 115 can be dipped in a mild solvent (e.g., water, alcohol, etc.) that contains a small percentage by weight of SAM materials to nano-coat the fibers 115. In certain implementation, the SAM is formed from a compound of $SiO_2$ and OH chains. Treating the fibers 115 one-ribbon-at-a-time provides better access to the fibers 115 for easier and more consistent treatments.

The sub-modules 136 also facilitate formation of the tips 119 on the bare optical fibers 115. The sub-modules 136 allow a user to process the fibers 115 ribbon-by-ribbon 117 so that no more than one row of fibers 115 is being terminated at any one time. In some implementations, a laser cuts the bare optical fibers 115 extending from one sub-module 136 in the same process step. In other implementations, the optical fibers 115 are otherwise cut. In certain implementations, the edges of the optical fibers 115 are smoothed or rounded to facilitate sliding of the optical fibers 115 into a groove or channel without gouging surfaces of the fiber 115 or channel.

In certain implementations, the optical fiber tips 115 are cut at an angle so that the tips 119 extend at least partially along the longitudinal axis of the optical fibers 115 (e.g., see FIG. 18). For example, in some implementations, the fibers tips 119 are cut at an angle of about 5° to about 35°. In certain implementations, the fibers tips 119 are cut at an angle of about 8° to about 30°. In certain implementations, the fibers tips 119 are cut at an angle of about 10° to about 25°. In certain implementations, the fibers tips 119 are cut at an angle of about 10° to about 20°. In certain implementations, the fibers tips 119 are cut at an angle of about 8° to about 15°.

As shown in FIG. 10, the inner housing part 135 is slid over the rear portions of the sub-modules 136 so that the inner housing part 135 at least partially surrounds the sub-modules 136. In certain implementations, the interior of the inner housing part 135 defines shelves or guide grooves for receiving the sub-modules 136. Front portions of the sub-modules 136, including the notched sections 137, protrude forwardly of the inner housing part 135. One or more pins or staples 139 may be inserted through the inner housing part 135 and through the apertures 138 defined in the sub-modules 136 to hold these components stationary relative to each other. For example, FIG. 10 shows one pin 139 being inserted into the inner housing part 135 and one pin 139 already inserted.

As shown in FIGS. 11 and 12, an outer housing 140 is assembled around the inner housing part 135 and sub-modules 136. In some implementations, the outer housing 140 includes a first outer housing part 141 and a second outer housing part 142 that can be welded or otherwise secured together (see FIG. 12). In certain implementations, the outer housing 140 also defines a holding section 144 to receive a front portion (e.g., ledge) of the crimp housing 132 (see FIG. 11). Accordingly, the crimp housing 132 is axially secured to the outer housing 140.

As shown in FIG. 11, free ends of the processed optical fibers 115 extend towards an open end 143 of the outer housing 140. In some implementations, the free ends extend past the open end 143. In certain implementations, a retractable shield can extend over the free ends to protect the free ends. The retractable shield can be spring-biased to the extended (i.e., covering position). The retractable shield can be moved to the refracted position to expose the free ends of the fibers 115 or when the plug 110 is coupled to an adapter or female connector 120. In other implementations, the free ends can be covered by a removable dust cap (see 146 of FIG. 14). In still other implementations, the free ends are disposed within the outer housing 140.

Aramid yarn or other retention members of the cable 114 are folded over the crimp housing 132 before the crimp housing 132 is secured to the outer housing 140. The retention members extend rearwardly over an exterior of the crimp housing 132. As shown in FIG. 13, the crimp sleeve 133 is slid over the crimp housing 132 and the retention members are crimped between the housing 132 and the sleeve 133 to provide axial strain-relief to the cable 114. As shown in FIG. 14, the boot 131 is slid forwardly over the crimp sleeve 133 to abut against the outer housing 140. The boot 131 provides inhibits radial bending of the optical fiber cable 114 beyond a minimum bend radius.

In certain implementations, the optical plug 110 may include a single row of optical fibers 115. In certain implementations, the optical plug 110 may include between two and six rows of optical fibers. In one example implementation, the optical plug 110 includes six rows of twelve optical fibers 115. In other implementations, the optical plug 110 includes a greater number of rows of optical fibers 115. Each row of optical fibers 115 may include between one and twenty-four optical fibers. In some implementations, each row includes between six and sixteen optical fibers. In certain implementations, each row includes between eight and twelve optical fibers. In one example implementation, each row includes about twelve optical fibers. In one example implementation, each row includes about eight optical fibers. In one example implementation, each row includes about sixteen optical fibers.

In some implementations, the optical plug 110 has a footprint that is no larger than a footprint of a conventional MPO plug. For example, some such plugs 110 may include about seventy-two optical fibers. In certain implementations, the footprint of the optical plug 110 can be smaller than the footprint of a conventional MPO connector. Some such plugs 110 may include less than seventy-two fibers. For example, some such plugs 110 may include sixty optical fibers. Other such plugs may include forty-eight optical fibers. Some such optical plugs 110 can terminate thirty-six optical fibers and have a footprint of less than half of the footprint of a conventional MPO connector. In some such implementations, the optical plug 110 may have a footprint of less than ¼ the footprint of a conventional MPO connector and terminate at least twenty-four optical fibers.

In some implementations, each optical plug 110 includes a display 145 that indicates an orientation or polarity of the optical fibers 115. For example, the display 145 can indicate in which direction the fiber tips 119 are angled (e.g., up, down, etc.). In certain implementations, the display 145 can indicate a direction in which the optical fibers are rotationally angled. In certain implementations, the optical plug 110 includes a first display 145 at a top of the plug body 122 and a different second display at a bottom of the plug body 122. In other implementations, one display 145 is disposed at a single side of the plug body 122.

In some implementations, a dust cap 146 can be mounted to the open end 143 of the outer housing 140 of the optical plug 110 to inhibit contamination of the optical fibers 115. In other implementations, however, a dust cap 146 is not used.

FIGS. 15-26 illustrate an example optical adapter 120 suitable for receiving the optical plug 110 shown above and how such an optical adapter 120 can be manufactured. FIGS. 15-18 show an example groove plate 150 that forms the basic building block from which the adapter 120 can be built. The groove plate 150 extends from a first axial end 151 to a second axial end 152. The groove plate 150 also has a first surface 153 and an opposite second surface 154. Notches 155 are defined in longitudinal sides of the groove plate 150 at an intermediate point between the two axial ends 151, 152. In the example shown, the notches 155 are defined at center points along the longitudinal sides.

The first surface 153 of the groove plate 150 defines a fiber mating region 160 at an intermediate section of the surface 153. A first channel 156 is recessed into the first surface 153 and extends from the fiber mating region 160 to the first axial end 151 of the groove plate 150. A second channel 157 also is recessed into the first surface 153 and extends from the fiber mating region 160 to the second axial end 152 of the groove plate 150. One or more pins 158 extend upwardly from the first surface 153 at the first axial end 151 of the groove plate 150. For example, one pin 158 may extend upwardly from opposite sides of the first axial end 151. One or more apertures 159 are defined in the first surface 153 at the second axial end 152 of the groove plate 150. For example, an aperture 159 may be defined in opposite sides of the second axial end 152. The apertures 159 are sized to receive the pins 158.

The fiber mating region 160 includes one or more walls 161 that define two or more grooves 162 that extend parallel to the longitudinal axis of the groove plate 150. The grooves 162 are sized to receive individual optical fibers 115. The walls 161 taper at the axial ends to facilitate insertion of optical fibers into the grooves 162 (see FIG. 15). Accordingly, optical fibers 115 of an optical plug 110 may be inserted onto the groove plate 150 from one of the axial ends 151, 152 and optical fibers 115' of another optical plug may be inserted onto the groove plate 150 from the other of the axial ends 151, 152. The tips 119 of the optical fibers 115, 115' engage each other at the fiber mating region 160 (e.g., see FIG. 18). In the example shown in FIG. 18, the optical fiber tips 119 are angled and each optical fiber 115, 115' is rotationally oriented so that at least a majority of the angled tip surfaces of the fibers 115, 115' contact each other.

As shown in FIG. 17, the fiber mating region 160 includes an undulating surface 163 defining a floor of the grooves 162. The undulating surface 163 includes at least one hump or peak 164 and at least one depression or trough 165. The peak 164 is located so as to raise the tip 119 of one of the optical fibers 115, 115' upwardly and the trough 165 is located so as to lower the tip 119 of the other of the optical fibers 115, 115' to facilitate engagement between the optical fibers 115, 115'. In the example shown, the peak 164 is disposed towards closer to the first axial end 151 to raise the corresponding optical fiber 115' and the trough 165 is disposed closer to the second axial end 152 to lower the corresponding optical fiber 115. In other implementations, the peaks 164 and troughs 165 can be disposed at opposite ends of the fiber mating region 160. The configuration of peaks 164 and troughs 165 at the fiber mating region 160 will be consistent on every groove plate 150 used to form the optical adapter 120.

As shown in FIGS. 19 and 20, a gel block 170 can be added to each groove plate 150. In some implementations, only one gel block 170 is added to each groove plate 150. In the example shown, the gel block 170 is added to the first channel 156. In other implementations, the gel block 170 could be added to the second channel 157 instead of the first channel 156. The gel block 170 generally extends between the fiber mating region 160 and the corresponding axial end 151, 152. In the example shown, the gel block 170 has a first axial end 171 disposed at the first axial end of the groove plate 150 and a second axial end 172 disposed at the fiber mating region 160. The gel block 170 has a width that corresponds with a width of the channel 156 in which the gel block 170 is disposed.

The gel block 170 includes a block portion 173, an edge portion 174 coupled to one end of the block portion 173, and a ridged portion 175 extending from another end of the block portion 173. In some implementations, the ridged portion 175 extends over a majority of the first channel 156. In certain implementations, the ridged portion 175 defines a plurality of longitudinally extending ridges 176. Each of the ridges 176 aligns with one of the grooves 162 at the fiber mating region 160 of the groove plate 150. In other implementations, the ridged portion 175 defines a generally even surface.

At least the ridged portion 175 of the gel block 170 is formed from or contains a gel material (e.g., the thixotropic material) suitable for cleaning dust, dirt, and other debris from optical fibers inserted through the ridged portion 175. In certain implementations, the entire gel block 170 is formed from the gel material. The easily deformable gel material may be pushed aside and/or penetrated by the optical fibers 115 as the optical fibers 115 is slid through the respective channel 156, 157. For example, optical fibers may puncture the edge 174 of the gel block 170 and moved individually through the ridges 176 of the ridged portion 175. The channel 156, 157 may remain sealed by the gel blocks 170 after the optical fibers 115 are fully and/or partially slid through the channel 156, 157. The gel blocks 170 may seal against the optical fibers 115 wherever they contact each other. By the time the optical fiber tips 119 reach the fiber mating region 160, the optical fiber tips 119 have been cleaned of debris. Accordingly, the optical fiber tips 119 are automatically cleaned when the optical fibers 115 of an optical plug 110 are inserted into an optical adapter 160.

In some implementations, the channels 156, 157 have sufficient volume to accommodate buckling of the optical fibers 115 if the optical fibers 115. For example, a length of one or more of the optical fibers 115 may be greater than a length provided between the plug 110 and the opposing fiber at the fiber mating region 160. In such implementations, the excess length may be taken up by bending of (i.e., undulations in) the optical fibers 115 through the respective channel 156, 157. In certain implementations, the fibers 115 can buckle within the gel blocks 170.

FIGS. 21 and 22 show an example gel-groove assembly 180 that is assembled from two groove plates 150 and two gel blocks 170. In various implementations, the groove plates 150 are coupled together using adhesive, ultrasonic welding, or other securing mechanisms. In the example shown, the gel-groove assembly 180 is formed from a first groove plate 150A having a first gel block 170A and a second groove plate 150B having a second gel block 170B. The first and second groove plates 150A, 150B are oriented so that the fiber mating surfaces 160 face each other and coupled together. The passages 162 of each groove plate 150A, 150B align with the passages 162 of the other groove plate 150A, 150B to form channels along which the optical fibers 115, 115' may extend.

The first and second groove plates 150A, 150B are oriented so that the first axial end 151 of the first groove plate 150A faces the second axial end 152 of the second groove plate 150B and vice versa. Accordingly, a first undulating surface 163 of the first groove plate 150A mirrors a second undulating surface 163 of the second groove plate 150B. The peaks 164 of the first undulating surface 163 face the troughs 165 of the second undulating surface 163 to form a channel leading in a first direction and the troughs 165 of the first undulating surface 163 face the peaks 164 of the second undulating surface 163 to form a channel leading in an opposite second direction.

The first channel 156 of the first groove plate 150A aligns with the second channel 157 of the second groove plate 150B to form a cavity at which the first gel block 170A is disposed (see FIG. 22). The second gel block 170B is disposed in a cavity formed between the first channel 156 of the second groove plate 150B and the second channel 157 of the first groove plate 150A. At least the edge 174 of each gel block 170a, 170B is sized to fill the cavity created between the opposing channels 156, 157 of the opposing groove plates 150.

As shown in FIG. 21, indicators 183, 184 can be disposed on the second surfaces 154 of each groove plate 150 to indicate the opposite axial ends 151, 152. In some implementations, the first axial end 151 is indicated by a first indicator member 183 and the second axial end 152 is indicated by a second indicator member 184 that is different from the first indicator member. In the example shown, the first indicator member 183 includes a single circle and the second indicator member 184 includes two circles. When the groove plates 150A, 150B are coupled together, the first indicator member 183 of the first groove plate 150A is aligned with the second indicator member 184 of the second groove plate 150B (see FIG. 22) and vice versa.

To form an optical adapter 120, multiple gel-groove assemblies 180 can be disposed in a stack 185 as shown in FIG. 23. The stack 185 extends longitudinally between a first axial end 186 and a second axial end 187. In the stack 185, each of the gel-groove assemblies 180 are commonly oriented so that the first indicator member 183 at a top side of each gel-grove assembly 180 aligns with the first indicator member 183 at a top side of the other gel-groove assemblies 180. Accordingly, the configuration of the fiber mating assembly 160 of one gel-groove assembly 180 matches the configuration of the fiber mating assemblies 160 of the other gel-groove assemblies 180.

One or more rows of optical fibers can be received at each axial end 186, 187 of the stack 185. Each row of optical fibers is inserted into one of the gel-groove assemblies 180 of the stack 185. Each optical fiber row inserted at the first axial end 186 of the stack 185 will proceed through the fiber mating region 160 along a similar path. For example, if a fiber in a first row received at the first axial end 186 is routed upwardly, then the corresponding fibers in the upper and/or lower rows received at the first axial end 186 also will be routed upwardly. If a fiber in a first row received at the first axial end 186 is routed downwardly, then the corresponding fibers in the upper and/or lower rows received at the first axial end 186 also will be routed downwardly.

As shown in FIG. 24, a spring assembly 190 can be coupled to the stack 185 of gel-groove assemblies 180. The spring assembly 190 includes two spring elements 191 each disposed at one of the longitudinal sides of the stack 185. Each spring element 191 includes an intermediate portion 192 shaped to fit in the notches 155 defined in one side of the groove plates 150 of the stack 185. The intermediate portions 192 help to retain the spring elements 191 is fixed axial positions position relative to the stack 185.

Each spring element 191 includes one or more arms 194 that extend outwardly from the intermediate portion 192 towards the first and second axial ends 186, 187 of the stack 185. In some implementations, the number of arms 194 of each spring element 191 corresponds to the number of gel-groove assemblies 180 contained in the stack 185. Accordingly, each arm 194 automatically aligns a portion of a corresponding gel-groove assembly 180. Each arm 194 laterally aligns with a corresponding one of the gel-groove assemblies 180. The arms 194 of each spring element 191 form a resilient section 195 along which the arms flex laterally towards and away from the stack 185. In certain implementations, the resilient section 195 includes one or more bends along the longitudinal axis of the spring element 191.

Axial end sections 196 of the spring arms 194 extend outwardly past the respective axial ends 186, 187 of the stack 185. The axial end sections 196 of the spring arms 194 of each spring element 191 curve inwardly towards the spring arms 194 of the other spring element 191. The tips of the axial end sections 196 form latches 197. In the example shown, the latches 197 are defined by curved portions of the axial end sections 196. In other implementations, a bulbous tip may be formed at the axial end sections 196. In still other implementations, the latches 197 may be otherwise formed at the axial end sections 196. The latches 197 are configured to retain an optical plug connector 110 inserted into one end of the optical adapter 120.

FIGS. 25 and 26 show an example optical adapter 120 including a first housing part 200 and a second housing part 210 enclosing the stack 185 and spring assembly 190. In the example shown, the first and second housing parts 200, 210 form the first and second axial ends, respectively, of the optical adapter 120. In the example shown, about half of the stack 185 is disposed within the first housing part 200 and about half of the stack 185 is disposed within the second housing part 210. In other implementations, however, the first and second housing parts 200, 210 can form top and bottom portions of the adapter 120 or left and right portions of the adapter 120. In still other implementations, the optical adapter housing 122 may be monolithically formed.

The first housing part 200 includes a first body 201 defining a first through-passage 202 extending along the longitudinal axis of the first housing part 200. A rim or ledge 204 extends laterally outwardly from the body 201 from the top, bottom, and sides of the body 201. First apertures 205 extend through the rim or ledge 204 to define an insertion axis parallel to the longitudinal axis of the first housing part 200. First channels 206 extend along the rim or ledge 204 at an angle to the longitudinal axis of the housing part 200. In the example shown, the channels 206 extend perpendicular to the longitudinal axis. The first apertures 205 extend through the channels 206.

The second housing part 210 includes a first body 211 defining a second through-passage 212 extending along the longitudinal axis of the second housing part 210. As shown in FIG. 25, ridges or shelves 213 are disposed within the through-passage 212. The ridges or shelves 213 extend inwardly from the outer axial end of the second housing part 210. A rim or ledge 214 extends laterally outwardly from the body 211 from the top, bottom, and sides of the body 211. Second apertures 215 extend through the rim or ledge 214 to define an insertion axis parallel to the longitudinal axis of the second housing part 210. Second channels 216 extend along the rim or ledge 214 at an angle to the longitudinal axis of the second housing part 210. In the example shown, the second channels 216 extend perpendicular to the longitudinal axis. The second apertures 215 extend through the second channels 216.

As shown in FIG. 26, the first and second housing parts 200, 210 are coupled together to form the optical adapter 120. In some implementations, the first and second housing parts 200, 210 are fixedly fastened together (e.g., by welding, adhesive, rivets, etc.). In other implementations, the first and second housing parts 200, 210 are removably fastened together (e.g., by screws). When the first and second housing parts 200, 210 are coupled together, the first apertures 205 align with the second apertures 215 to form through-passages that extend in a direction between axial ends of the adapter 120. Screws, rivets, or other fasteners may be inserted therethrough to secure the optical adapter 120 to a surface. The first channels 206 align with the second channels 216 to form through-passages 217 that extend in a direction between the top and bottom of the adapter 120. Alternatively, screws, rivets, or other fasteners may be inserted through the passages 217 to secure the optical adapter 120 to a surface.

Indicator members are provided at the axial ends of the optical adapter 120 to inform a user of the appropriate orientation of the optical plug 110 to be received at that axial end. In some implementations, the second axial end of the optical adapter 120 includes a first display 218 and the first axial end of the optical adapter 120 includes a second display 209. In certain implementations, the first and second displays 218, 209 match or are substantially similar to the first and second indicators 183, 184 of the gel-groove assemblies 180. In the example shown, the first display 218 includes a single circle and the second display 209 includes two circles. In certain implementations, the gel-groove assemblies 180 are oriented within the housing parts 200, 210 so that the first indicator 183 of the gel-groove assemblies 180 faces in the same direction and is aligned with the first display 218 and the second indicator 184 of the gel-groove assemblies 180 faces in the same direction and is aligned with the second display 209 (e.g., see FIG. 25).

As noted above, the gel-groove assembly 180 serves as a basic component for building the optical adapter 120. Accordingly, in some implementations, the optical adapter 120 can be built larger or smaller by increasing or decreasing the number of gel-groove assemblies 180 utilized in the adapter 120. For example, an adapter 120 may be formed to receive only four rows of fibers 115. Such an adapter 120 may be sized significantly smaller than an adapter 120 configured to receive six rows of fibers 115. To utilize a different number of gel-groove assemblies 180, the adapter outer housing 210, 220 would be modified to be larger or smaller and the spring assembly 190 would be modified to include a greater or lesser number of arms 194.

FIGS. 27 and 28 show a first optical plug 110A coupled to a first axial end of an optical adapter 120 and a second optical plug 110B in the process of being coupled to a second axial end of the optical adapter 120. As shown in FIG. 27, the second optical plug 110B is rotationally oriented so that the display 145B faces in the same direction as the display first 218 at the second axial end of the adapter 120. In some implementations, the outer housing 140 of the plug 110B fits around an exterior of the second housing part 210 of the adapter 120. In other implementations, however, the outer housing 140 of the plug 110B fits within the second housing part 210 of the adapter 120.

As shown in FIG. 28, the optical fibers 115 of the optical plug 110B are aligned with the through-passage 212 extending through the second housing part 210 of the optical adapter 120. The tips 119 of the optical fibers 115 of the optical plug 110B are disposed at the open end of the optical plug 110B. In some implementations, the tips 119 are flush with the open end of the plug 110B. In other implementations, the tips 119 extend outwardly from the open end. In still other implementations, the tips 119 are recessed within the open end. The tips 119 of the optical fibers 115 need not be separately cleaned or polished by a technician prior to mating the plug 110B and the adapter 120.

The second housing part 210 of the optical adapter 120 includes grooves 213 to accommodate the sub-modules 136 disposed within the outer housing 140 of the optical plug 110B. In the example shown, the number of grooves 213 is equal to the number of sub-modules 136. When the plug 110B is mated to the adapter 120, the sub-modules 136 within the plug 110B slide along the grooves 213 of the adapter 120 to position the rows of optical fibers 115 appropriately relative to the gel-groove assemblies 180. For example, each row of optical fibers 115 can be aligned with the edge 174 of the gel block 170 of a corresponding gel-groove assembly 180.

As the optical fibers 115 of the plug 110B continue to slide into the adapter 120, the axial end sections 196 of the spring elements 191 cam over axial ends of the sub-modules 136 until the latches 197 snap into the notches 137 defined in the sub-modules 136. Accordingly, the spring elements 191 position and retain the sub-modules 136 relative to the gel-groove assemblies 180.

The optical fibers 115 slide through the gel block 170 towards the fiber mating region 160. The gel forming the gel block 170 cleans the optical fibers 115 as the fibers 115 pass through the gel block 170. The tips 119 of the fibers 115 eventually pass completely through the gel block 170 and into the channels defined at the fiber mating region 160. The undulating surfaces of the fiber mating regions 160 position the fibers 115 to mate with fibers (not shown) extending through the opposite axial end of the adapter 120.

FIGS. 29-32 illustrate alternative implementations of connection systems in which a first plug holding optical fibers 115 of a first cable mates with a second plug holding a stack 185 of gel-groove assemblies 180, which hold optical fibers of a second cable. For example, the connection systems can include a card side and a backplane side. In such implementations, the first plug forms the card side and the second plug forms the backplane side. FIGS. 29-30 illustrate a first implementation of such a connection system 220 including a first plug 230 and a second plug 240. FIGS. 31-32 illustrate a second implementation of such a connection system 225 including a first plug 250 and a second plug 260.

The first plug 230 of the connection system 220 includes a body 231 that is substantially similar to the plug body 112 of the optical plug 110. Ribbons of optical fibers 115 are retained by sub-modules 136 from which tips 119 of the optical fibers 115 protrude towards an open end of the plug body 231. The sub-modules 136 define notches 137 and are held in place by inner housing 135. Ledges 232 extend laterally outwardly from the open end of the plug body 231. Apertures 233 are defined through the ledges 232 to face opposite axial ends of the connection system 220. One or more tabs 234 also extend upwardly and/or downwardly from the ledges 232.

The second plug 240 includes a body 241 that is configured to hold one or more gel-groove assemblies 180 (e.g., a stack 185 of gel-groove assemblies 180) and a spring assembly 190. The plug body 241 defines a through-passage in which the stack 185 and spring assembly 190 are disposed. At least a portion of the stack 185 extends outwardly from the second plug body 241. In the example shown, more than half of the stack 185 extends outwardly from the second plug body 241. In other implementations, less than half of the stack 185 extends outwardly from the second plug body 241. The spring assembly 190 is held axially by the second plug body 241. For example, opposing tapered interior surfaces 247 at the forward end of the plug body 241 can engage contours of the spring elements 191 to hold the spring elements 191 to the second plug body 241. The spring elements 191 hold the stack 185 therebetween as disclosed above.

Ledges 242 extend laterally outwardly from the forward end of the second plug body 241. Pins or rods 243 extend forwardly of the ledges 242. In some implementations, the rods 243 are configured to align the second plug body 241 with the first plug body 231. In certain implementations, the rods 243 are configured to at least laterally retain the second plug body 241 at the first plug body 231. The rods 243 are aligned with and sized to fit within the apertures 233 of the first plug body 231. In certain implementations, the tips 244 of the rods 243 are pointed or tapered to aid insertion of the rods 243 through apertures 233 in the ledges 232 of the first plug body 231.

As the first and second plug bodies 231, 241 are moved towards each other, the rods 243 slide through the apertures 233. The tips 119 of the optical fibers 115 pass between the spring elements 191 and enter the respective gel-groove assembly 180 of the stack 185. The tips 119 are cleaned as they pass through the gel block 170 and then enter the fiber mating region of the gel-groove assembly 180. The latches 197 of the spring elements 191 ride over the ends of the sub-modules 136 and snap into the notches 137 defined in the sub-modules 136. The engagement of the latches 197 holds the first and second plugs 230, 240 together.

Referring now to FIGS. 31 and 32, the first plug 250 of the connection system 225 includes a body 251 that is substantially similar to the plug body 112 of the optical plug 110. Ribbons of optical fibers 115 are retained by sub-modules 136 from which tips 119 of the optical fibers 115 protrude towards an open end of the plug body 231. The sub-modules 136 define notches 137 and are held in place by inner housing 135. Ledges 252 extend laterally outwardly from the open end of the plug body 251. Apertures 253 are defined through the ledges 252 orthogonal to the longitudinal axis of the connection system 225. In other implementations, one or more tabs extend upwardly and/or downwardly from the ledges 252.

The second plug 260 of the connection system 225 includes a body 261 that is configured to hold one or more gel-groove assemblies 180 (e.g., a stack 185 of gel-groove assemblies 180) and a spring assembly 190. The plug body 261 defines a through-passage in which the stack 185 and spring assembly 190 are disposed. The spring assembly 190 is held axially by the second plug body 261. For example, opposing tapered interior surfaces 267 at the forward end of the plug body 261 can engage contours of the spring elements 191 to hold the spring elements 191 to the second plug body 261. The spring elements 191 hold the stack 185 therebetween as disclosed above.

A ledge 262 extends laterally outwardly from the forward end of the second plug body 261. Apertures 263 are defined through the ledge 262 orthogonal to the longitudinal axis of the connection system 225. In other implementations, one or more tabs extend upwardly and/or downwardly from the ledge 262. A forward portion 264 extends forwardly of the ledge 262 so that the second plug body 261 covers a majority of the stack 185 and spring assembly 190. In the example shown, the latches 197 of the spring assembly 190 extend forwardly of the forward portion 264. In other implementations, the latches 197 may be flush with or recessed within the forward portion 264. The forward portion 264 is sized to fit within the first plug body 251.

As the first and second plug bodies 251, 261 are moved towards each other along an insertion direction I, forward portion 264 slides into the first plug body 251. The tips 119 of the optical fibers 115 pass between the spring elements 191 and enter the respective gel-groove assembly 180 of the stack 185 within the second plug body 261. The tips 119 are cleaned as they pass through the gel block 170 and then enter the fiber mating region of the gel-groove assembly 180. The latches 197 of the spring elements 191 ride over the ends of the sub-modules 136 of the first plug body 151 and snap into the notches 137 defined in the sub-modules 136. The engagement of the latches 197 holds the first and second plugs 250, 260 together. The ledge 262 of the second plug 260 abuts the ledges 252 of the first plug 250.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. An optical adapter comprising:
   (a) at least one gel-groove assembly extending from a first axial end to a second axial end, the gel-groove assembly including a fiber mating region disposed at an intermediate point between the first and second axial ends, the gel-groove assembly also including a first gel block extending between the first axial end and the fiber mating region, and a second gel block extending between the second axial end and the fiber mating region;
   (b) a spring assembly including at least one spring element positioned at a longitudinal side of the gel-groove assembly, the spring element being axially fixed to the gel-groove assembly, the spring element being configured to laterally position the gel-groove assembly, and the spring element including latches; and
   (c) an outer housing defining a through-passage extending between first and second ends of the outer housing, the through-passage being sized to accommodate the gel-groove assembly and the spring assembly, the spring assembly being axially fixed relative to the outer housing, wherein the first axial end of the gel-groove assembly is accessible through the first end of the outer housing and wherein the second axial end of the gel-groove assembly is accessible through the second end of the outer housing.

2. The optical adapter of claim 1, further comprising a plurality of additional gel-groove assemblies arranged in a stack, each additional gel-groove assembly extending from a first axial end to a second axial end, each additional gel-groove assembly including a fiber mating region disposed at an intermediate point between the respective first and second axial ends, each additional gel-groove assembly also including a first gel block extending between the first axial end and the fiber mating region, and a second gel block extending between the second axial end and the fiber mating region.

3. The optical adapter of claim 2, wherein each spring element includes a plurality of arms, each arm being aligned with one of the gel-groove assemblies.

4. The optical adapter of claim 1, wherein the fiber mating region of each gel-groove assembly includes undulating surfaces that align angled tips of optical fibers received at the first axial end with angled tips of optical fibers received at the second axial end.

5. The optical adapter of claim 4, wherein each fiber mating region includes a plurality of channels through which the optical fibers are inserted.

6. The optical adapter of claim 1, wherein the outer housing includes a display at the first end to indicate an orientation at which an optical plug should be inserted.

7. The optical adapter of claim 1, wherein the outer housing includes a first housing part and a second housing part that are fixedly coupled together around the gel-groove assembly and spring assembly.

8. The optical adapter of claim 1, wherein the spring assembly includes two spring elements disposed at opposite longitudinal sides of the gel-groove assembly.

9. The optical adapter of claim 1, wherein each gel-groove assembly is formed from two gel blocks sandwiched between two identical groove plates, the two identical groove plates being flipped relative to each other so that one axial end of one of the groove plates aligns with an opposite axial end of the other groove plate.

10. A connection system comprising:
   (a) an optical connector assembly including a stack of gel-groove assemblies and a spring assembly mounted within a housing, each of the gel-groove assemblies including a first gel block at a first axial end, a second gel block at a second axial end, and a fiber mating region between the first and second gel blocks, the spring assembly including spring elements that couple to the stack of gel-groove assemblies, each of the spring elements including first latches and second latches; and
   (b) an optical plug terminating a fiber optic cable including a plurality of optical fibers, the optical plug including a plurality of sub-modules over-molded over arrays of the optical fibers, each sub-module defining notches at longitudinal sides of the sub-modules, the notches being sized to receive the first latches of the spring elements when the optical plug is coupled to the first axial end of the optical connector assembly, the first latches holding the optical plug to the optical adapter, wherein bare optical fibers extend from the sub-modules, pass through the first axial gel block of the optical connector assembly, and enter the fiber mating region of the optical connector assembly when the optical plug is coupled to the first axial end of the optical connector assembly.

11. The connection system of claim 10, wherein the optical connector assembly includes an optical adapter and wherein the second axial end of the housing is configured to receive a second optical plug so that the second latches of the spring elements hold the second optical plug to the optical adapter.

12. The connection system of claim 10, wherein the optical connector assembly includes a backplane connector and wherein the second axial end of the housing is configured to terminate an optical fiber cable.

* * * * *